H. H. STEELE.
TYPE WRITING AND COMPUTING MACHINE.
APPLICATION FILED FEB. 5, 1913.

1,259,311.

Patented Mar. 12, 1918.
10 SHEETS—SHEET 1.

WITNESSES:
E. M. Wells
R. H. Strother

INVENTOR:
Herbert H. Steele
By Jacob Felbel
HIS ATTORNEY

H. H. STEELE.
TYPE WRITING AND COMPUTING MACHINE.
APPLICATION FILED FEB. 5, 1913.

1,259,311.

Patented Mar. 12, 1918.
10 SHEETS—SHEET 4.

WITNESSES:
E. M. Wells.
R. H. Strother.

INVENTOR:
Herbert H. Steele
By Jacob Felbel
HIS ATTORNEY

H. H. STEELE.
TYPE WRITING AND COMPUTING MACHINE.
APPLICATION FILED FEB. 5, 1913.

Patented Mar. 12, 1918.
10 SHEETS—SHEET 5.

WITNESSES.

INVENTOR.
Herbert H. Steele
By Jacob Felbel
HIS ATTORNEY

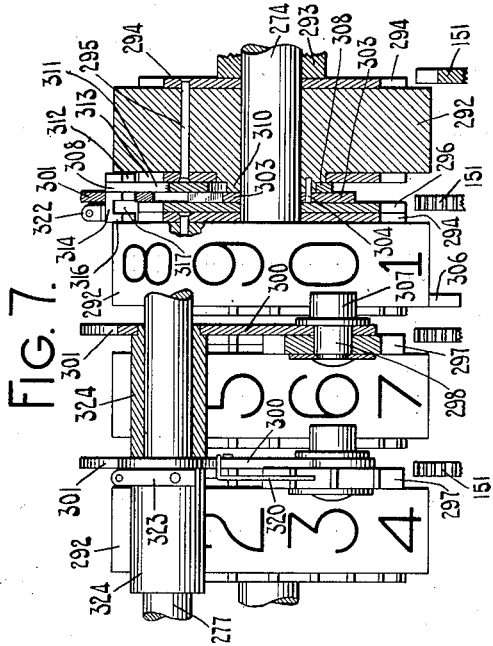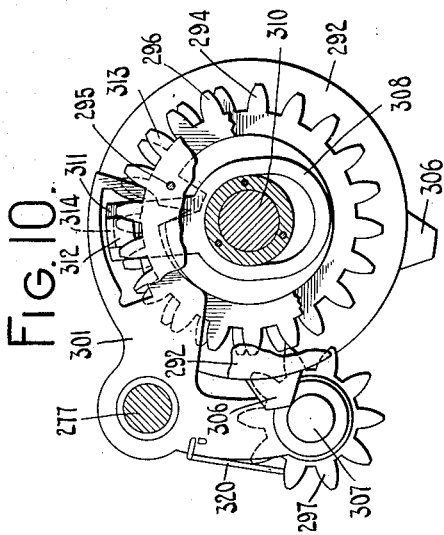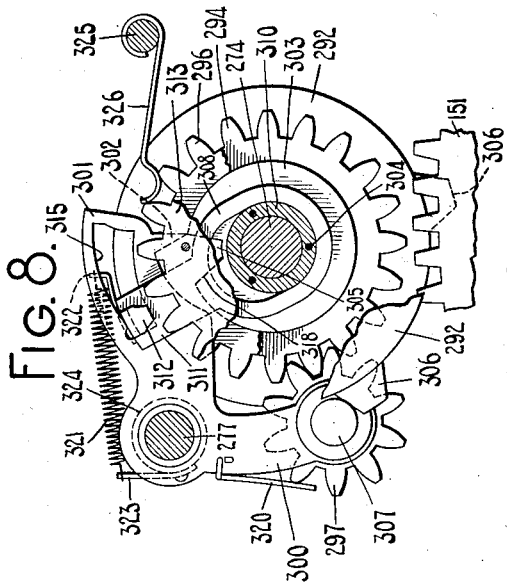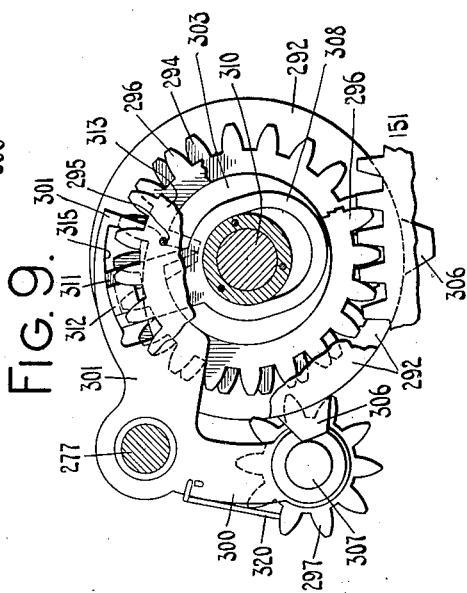

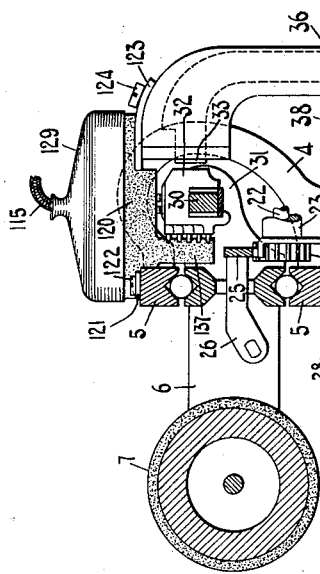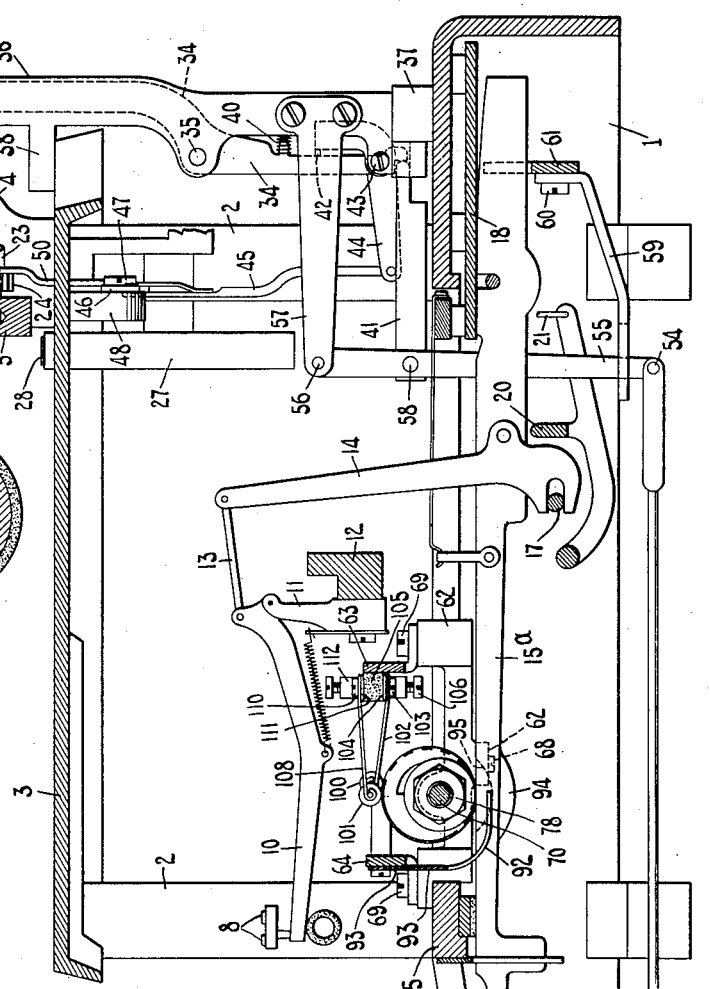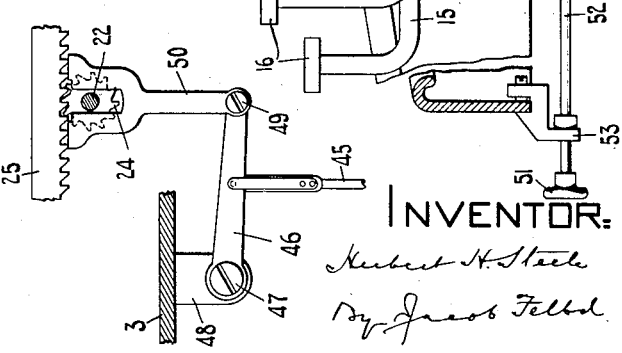

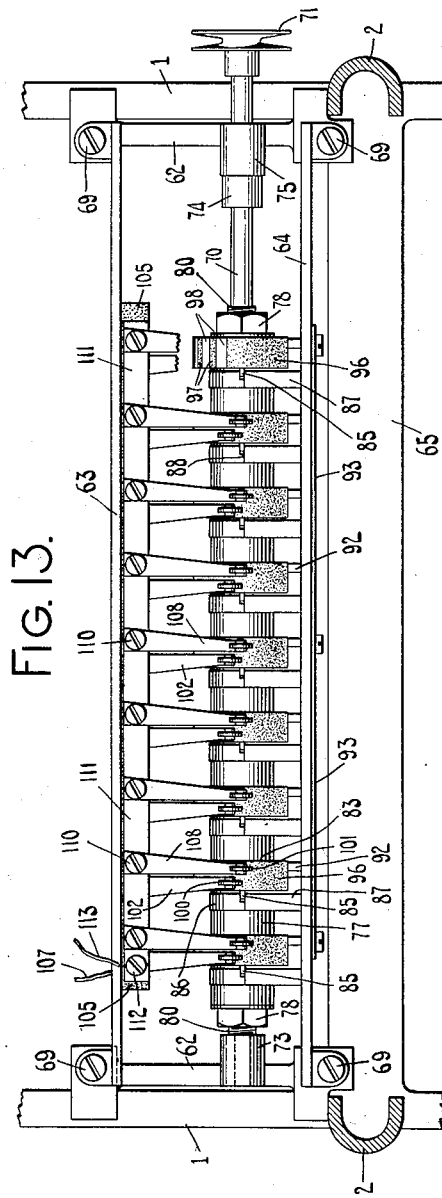

H. H. STEELE.
TYPE WRITING AND COMPUTING MACHINE.
APPLICATION FILED FEB. 5, 1913.
1,259,311.
Patented Mar. 12, 1918.
10 SHEETS—SHEET 9.
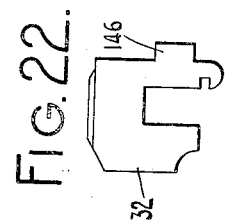
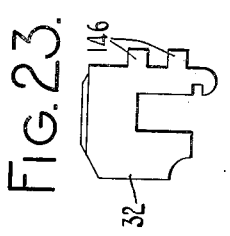
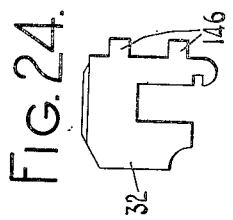
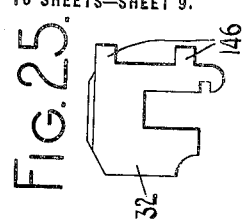
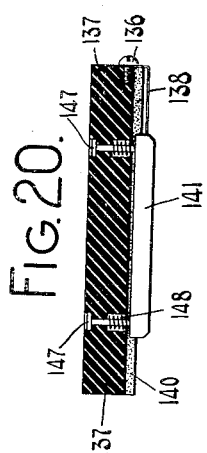
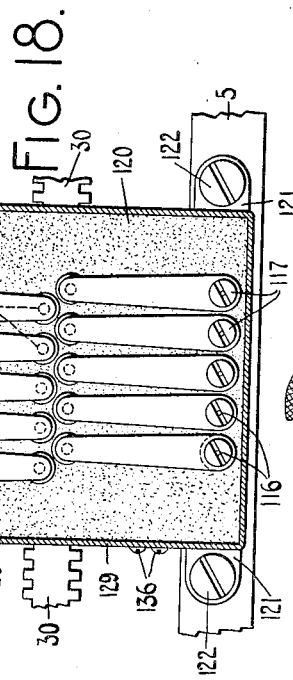
WITNESSES:
E. M. Wells
R. H. Strother
INVENTOR:
Herbert H. Steele
By Jacob Felbel
HIS ATTORNEY

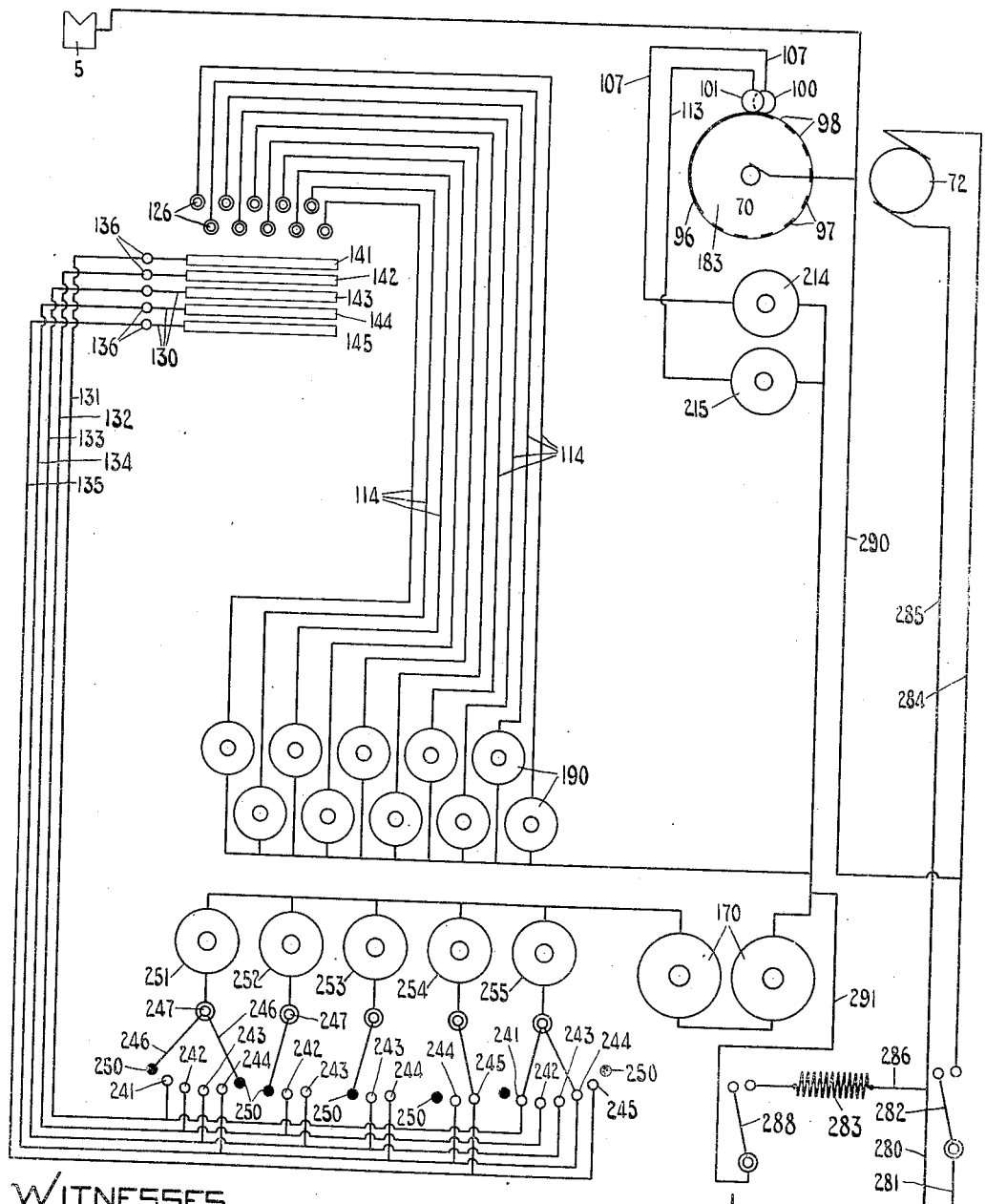

UNITED STATES PATENT OFFICE.

HERBERT H. STEELE, OF MARCELLUS, NEW YORK, ASSIGNOR, BY MESNE ASSIGNMENTS, TO REMINGTON TYPEWRITER COMPANY, OF ILION, NEW YORK, A CORPORATION OF NEW YORK.

TYPE-WRITING AND COMPUTING MACHINE.

1,259,311.  Specification of Letters Patent.  Patented Mar. 12, 1918.

Application filed February 5, 1913. Serial No. 746,302.

*To all whom it may concern:*

Be it known that I, HERBERT H. STEELE, a citizen of the United States, and resident of Marcellus, in the county of Onondaga and State of New York, have invented certain new and useful Improvements in Typewriting and Computing Machines, of which the following is a specification.

My invention relates to computing machines and also to combined typewriting and computing machines.

The invention has for its principal object to provide improved means to add or otherwise to register numbers written on a typewriting machine with or without connection with other typewritten matter.

One of the objects of the invention is to provide means to add automatically numbers written in various positions crosswise of a sheet of paper either on the same register or on different registers or both, that is to say, to add numbers written in vertical columns either all on the same register or else on different registers or to add the vertical columns on different registers and also to combine the numbers in two or more of such columns into a single total obtained on a single register, means being provided to vary these matters so as to get any one of a variety of results as may be desired giving vertical totals, grand totals, cross totals and various combinations of such several sorts of totals as may be required by the particular piece of work in hand.

Another object of the invention is to operate the adding mechanism by a power independent of that applied to the typewriter keys.

Another object of the invention is to control the selection of the particular register to be operated by means of the typewriter carriage and preferably by means of the tabulator mechanism.

Another object of the invention is to improve the construction of the computing mechanism in certain particulars which will hereinafter appear.

Another object of the invention is to improve the connections between the computing mechanism and the typewriting mechanism.

To the above and other ends, my invention consists in certain features of construction and combinations and arrangements of parts, all of which will be hereinafter described and particularly pointed out in the claims.

A machine having my invention embodied therein is illustrated in the accompanying drawings in which—

Figure 6:
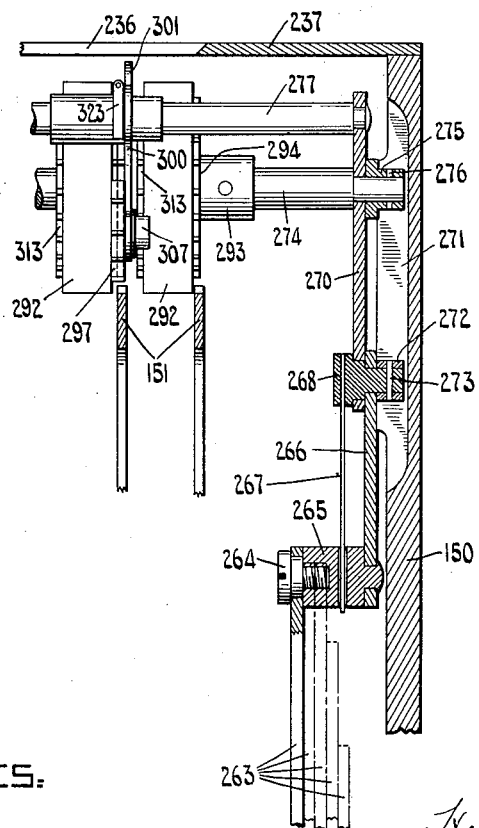
Fig. 6 is a front elevation of parts of the mechanism in section about on the line $v$—$v$ of Fig. 2, this Fig. 6 being on an enlarged scale.

Figs. 7, 8, 9 and 10 are views on a still larger scale than Fig. 6 and illustrating the construction of the register mechanism. Fig. 7 is a front elevation of a portion of one of the registers with parts broken away and parts in section, the right-hand portion of the figure on a plane through the axis of the register wheel shaft and the middle portion on the axial plane common to two other shafts forming parts of the transfer mechanism. Fig. 8 is a right-hand side elevation of one of the register wheels and some of the associated mechanism including fragments of the next adjacent register wheel and the transfer devices, the parts in this figure being shown in normal position. Fig. 9 is a view of substantially the same parts as Fig. 8 but with the register in mesh with the racks and the parts shown somewhere near the middle of the transferring operation. Fig. 10 is a view like Fig. 9 but showing the parts in the latter half of the transferring operation. In Figs. 8, 9 and 10 some of the parts are in fore and aft vertical section.

Fig. 11 is a right-hand side elevation on a reduced scale with parts in section and parts omitted or broken away and showing enough of the typewriting mechanism to make clear the connection of my devices therewith and showing the connections whereby said typewriting mechanism controls the computing mechanism.

Fig. 12 is a fragmentary rear elevation of part of the tabulator mechanism.

Fig. 13 is a plan view on the same scale as Fig. 11 of the devices directly controlled by the numeral keys of the typewriter and which control the differential mechanism of the computer.

Fig. 14 is a fragmentary front elevation, partly in vertical section, of some of the devices shown in Fig. 13.

Figs. 15 and 16 are side elevations of the same, the parts being shown in normal position in Fig. 15 and in Fig. 16 in the position they occupy just after a key has been depressed.

Fig. 17 is a fragmentary detail view of a certain disconnecting device.

Figs. 14–17 are on an enlarged scale.

Figs. 18–25 are views on an enlarged scale of the devices whereby the typewriter carriage and tabulator control the denomination selection and the selection of the register to be operated. Fig. 18 is a top plan view, with the casing in section, of certain denominational devices whereby the typewriter carriage and tabulator select the denominational devices of the computing machine. Fig. 19 is a left-hand side elevation of the same and also of the register selecting devices, parts being shown in vertical section. Fig. 20 is a horizontal section through a part of the register selecting means. Fig. 21 is a rear view in vertical section through the same. Figs. 22, 23, 24 and 25 are side views of column stops for the typewriter, said column stops being formed or provided with lugs which take part in the selection of the register to be operated.

Fig. 26 is a diagram of the electrical connections.

My invention is applicable or adaptable to typewriting machines generally. In the present instance it is shown applied to a Monarch typewriter, which is a front strike type bar machine in which the printing mechanism is relatively stationary and the paper is mounted on a traveling carriage. The main frame of the Monarch machine comprises a base part 1 from which rise posts 2 that support a top plate 3. Standards 4 rise from said top plate and support stationary grooved rails 5 along which a carriage 6 is adapted to travel, said carriage having ball or roller bearing connection with the rails 5. The paper is fed around a roller platen 7 which is mounted on said carriage. The printing instrumentalities comprise types 8 mounted on front strike type bars 10, the hangers 11 of which are mounted on a shiftable type bar segment 12. Said type bars are actuated through links 13, sub-levers 14 and key levers 15 by printing keys 16 mounted on the forward ends of said key levers. The types 8 and keys 16 include types and keys for printing numerals as well as letters and other characters. The sub-levers 14 are pivoted to the key levers and coöperate with a fulcrum bar 17. Said key levers themselves have a rolling bearing at their rear ends on a fulcrum plate 18. The key levers 15 actuate a universal bar 20, which through a link 21 operates the escapement that ordinarily controls the feed of the carriage. This escapement is not shown in the drawings but in typewriting machines such escapements usually include a dog rocker operated by the link 21 and having mounted thereon feed dogs, which engage an escapement wheel, which wheel is mounted on the rear end of a shaft 22, which shaft is journaled in a bracket 23 mounted on the top plate 3 of the machine. At its forward end the shaft 22 carries a feed pinion 24 which normally engages a feed rack 25 which is, however, capable of being lifted out of said pinion to release the carriage from the control of its escapement, said rack being mounted on the rear ends of arms 26 which arms are pivoted to the carriage 6. The carriage is fed across the machine by the usual spring drum 27 and band 28.

The typewriting mechanism includes tabulator mechanism for bringing the carriage quickly to proper positions for writing numbers in columns. This mechanism may be of any suitable construction, but as here shown it includes a column stop bar 30 which in this machine is mounted on brackets 31 projecting toward the rear from the carriage 6, the standards 4 being arched toward the back of the machine as shown in order to admit of the travel of said column stop bar. The bar 30, together with a locking bar 29 mounted on the underside thereof, serves to support column stops 32 which are mounted thereon. This stop bar is formed with a series of vertical slots in its front and rear sides, said slots spaced a letter space distance apart and the column stops are of the ordinary forked construction to be slipped down over said bar, straddling the same and entering said slots, and one branch of each stop having a notch to be engaged by the bar 29 to lock the stop in position. The stops 32 are adjustable to any desired letter space position by removing them from the bar and replacing them in any desired one of the pairs of vertical slots. These stops are, however, in addition to their ordinary features provided with certain lugs for controlling the computing mechanism as will be more fully described presently.

The column stops 32 are adapted to be arrested by any one of a series of denominational stops 33, these consisting of the forwardly projecting upper ends of a series of levers 34 which levers are pivoted at 35 in a stationary frame 36 secured at 37 to the base 1 of the typewriter frame and at 38 to the top plate 3 thereof. Springs 40 normally hold the levers 34 in such positions that the stops 33 are out of the paths of the stops 32 but said levers are adapted to be rocked by means of push bars 41 arranged to engage the lower ends of the levers 34 and each extending therefrom toward the front of the machine.

In order to release the carriage when one of the denominational stops is operated, a universal bar 42 is provided, said universal bar lying back of the lower arms of the levers 34 and pivoted at 43 and having an arm 44 projecting forward from said pivot. A link 45 extends upward from the free end of the arm 44 and acts on a lever 46 (Fig. 12) pivoted at 47 to a bracket 48 depending from the top plate 3. Said lever 46 has pivoted thereto at 49, a lifter 50 having at its upper end shoes that lie beneath the feed rack 25. The construction is such that when any of the denominational stops is operated the feed rack is lifted out of the pinion 24 and the carriage is free to run toward the left until it is arrested by one of the stops 32 striking the operated one of the stops 33.

The tabulator mechanism as thus far described is substantially identical with that ordinarily employed in the Monarch machine although it may, so far as my invention is concerned, be otherwise constructed. In the ordinary Monarch tabulator the push bars 41 are operated by depressible keys arranged across the machine just back of the keys 16. The space ordinarily occupied by the tabulator keyboard is in the present machine occupied by certain devices associated with the computing mechanism and the tabulator keys are therefore shown here in modified form consisting of push buttons 51 located in the extreme lower front part of the machine and mounted on the forward ends of push rods 52 which rods slide through suitable holes in a supporting bracket 53 secured to the front part of the base of the typewriter frame. The rear ends of the push rods 52 are pivoted at 54 to the lower ends of vertical levers 55 of the second order, said levers at their upper ends being pivoted at 56 to a rod supported by brackets 57, which brackets extend forward from the stationary frame 36, and said levers 55 have the push bars 41 pivoted thereto at 58. The lower ends of the levers 55 are guided by a comb plate 59 secured by screws 60 to a comb plate 61 which guides the rear ends of the printing key levers 15.

Some of the most important features of my invention are capable of embodiment in machines in which the typewriting mechanism and also the computing mechanism are both manually operated either by the operation of the numeral keys of the typewriter or otherwise. In the present instance, however, the computing mechanism is operated electrically.

The numeral keys of the typewriter may, for some of the purposes of my invention, control the differential mechanism of the computer in any one of a variety of ways, but in the present instance each of said keys transmits a series of electrical impulses appropriate to the number printed by that key.

The mechanism for transmitting these electrical impulses comprises a rectangular frame, Figs. 11, 13 and 14, said frame comprising two end bars 62, a rear bar 63 and a front bar 64, said frame being secured in a front bar of the typewriter just back of the base of the typewriter and beneath the type bars 10. In keyboard and beneath the type bars 10. In the present instance the bars 62 have each lugs that overlie the side bars of the base 1 of the typewriter and also a cross bar 65 of said frame; and each of said bars 62 has a lug 66, Fig. 14, that underlies a flange 67 of the side bar 1, which flange is engaged by a screw 68 threaded through the lug 66 to clamp the bar 62 to the machine frame. As shown in the present instance the bars 63 and 64 are of sheet metal and each of them has brackets or ears which are secured to the bars 62 by screws 69.

The bars 62 have journaled therein a transverse shaft 70 having on one end thereof a grooved pulley 71 by which said shaft can be continuously rotated from any source of power, such, for example, as a small electric motor indicated in Fig. 26 at 72. As shown in the present instance the left-hand end of the shaft 70 is reduced to enter a bearing 73, the reduction of the diameter of the shaft forming a shoulder which prevents endwise motion of the shaft toward the left; and a collar 74 fixed in any suitable manner on said shaft just inside the bearing 75 at the right-hand end thereof, prevents endwise motion of said shaft toward the right.

At the part thereof which overlies the printing key levers, the shaft 70 has mounted thereon a series of collars 76 and 77, Fig. 14, the collars 76 alternating with the collars 77 and all rigidly secured to the shaft by means of nuts 78 screwed on to threaded parts 80 of the shaft 70, said nuts being tightened against each other so as to compress the whole series of collars between the two nuts. The collars 77 are merely spacing and guiding devices. There are nine of the collars 76 and each of them is situated directly over one of the numeral key levers, which numeral key levers have been lettered 15ᵃ in Fig. 14 to distinguish them. The collars 76 all have the same outline which is that shown in Fig. 15. It will be seen that each of these collars is circular throughout about three-quarters of its periphery, the circular part being concentric with the shaft 70. The other quarter of the perimeter of the collar consists of an arc 81 dropped down an amount equal to the altitude of an abrupt radial shoulder 82. Each of the collars 76 is surrounded loosely by a ring 83 of circular outline as to its outside boundary but with an opening therein of somewhat elongated form but comprising a shoulder 84 and two arcs of circles extending one forward and the other backward from said shoulder and eccentric to each other, the eccentricity of the two arcs being equal to the altitude of the shoulder 84 which in turn is as here shown equal to the altitude of the shoulder 82. Motion of the rings 83 lengthwise of the shaft, is prevented by the collars 77, which are of greater diameter than the collars 76. Each ring 83 is normally held up, in the position shown in Fig. 15 where the collar 76 is free to rotate in said ring, said collar turning in the direction of the arrow. The ring can, however, be released, in which case it can drop down to the position shown in Fig. 16 where the shoulder 84 of the ring is engaged by the shoulder 82 of the collar, in which position of the parts the ring will of course be forced to rotate with the shaft 70 and collar 76. In this position of the parts the outside periphery of the ring is concentric with the shaft 70. The rings 83 are normally held up in their Fig. 15 positions by the numeral key levers 15ᵃ as shown at the right of Fig. 14. When one of said numeral key levers is depressed to print a number this support is withdrawn from the ring 83 which drops down to the Fig. 16 position as shown in Fig. 14 at the left. The result is that each ring is given a rotation at each actuation of the corresponding key lever and this rotation of the ring causes certain electrical impulses to be transmitted to the adding machine as will presently appear.

In order to disconnect the ring from the shaft and to arrest the ring at the end of a single rotation, said ring is provided with a pin 85 projecting from one side thereof and adapted to engage the curved nose 86 of a bracket 87 projecting toward the rear of the machine from the cross bar 64. Said nose 86 lies by the side of the ring 83 and in the path of the pin 85 so that as said ring and pin are nearing the completion of a rotation the pin is caused to ride on the nose which acts as a cam to lift the ring to its Fig. 15 position where it is disengaged from the shaft. The bracket 87 is formed with a rear face 88 which acts to arrest the pin 85 as will be understood. Said bracket is also formed with a notch 90 beneath the normal position of the pin 85, which notch as will be seen is adapted to allow the pin to drop down vertically when the key lever is depressed.

It will be observed that the very last part of the rotation of the ring will be caused by momentum. When the ring is arrested in the position shown in Fig. 15, the collar 76 being in motion at the time instantly runs ahead of the ring so that the higher part of said collar runs under the low part of the inside outline of the ring. For the next three-quarters of a rotation the collar 76 itself acts to hold the ring in its Fig. 15 position and the parts are so timed that by the time the arc 81 of the collar reaches the shoulder 84 the key lever will have been restored to normal position and will retain the ring 83 in its Fig. 15 position. If the collar happens to be just past the position shown in Fig. 15 at the time when the key lever is struck said collar will hold the ring up for a brief time but not so long but that the arc 81 will reach the shoulder 84 before the key lever has returned so far toward normal position as to hold the ring up. Once the ring has begun to turn, the pin 85 moves in under a projection 91 in the bracket 87 and the key lever cannot lift it back to its normal position so that the ring will go on and complete its rotation even though the falling of the ring may have been a little delayed in the first instance.

It will be perceived that, if the shaft 70 is so speeded as that it makes a rotation in a time about equal to or a little more than the duration of the shortest key stroke, a ring will be sure to drop at least once at each stroke; and that if no key stroke ever has a duration as great as a little less than two rotations of the shaft, then no ring can drop more than once at a key stroke. In any given typewriting machine, the actual durations of the key strokes under the conditions of ordinary use, are sufficiently uniform so that the shaft 70 can be given a speed such that a ring will always drop once and no more at each stroke of a numeral key. If a key were to be depressed and held down, then its ring would drop and be rotated at every other turn of the shaft; but this is not the intended mode of operation, unless for some reason, such as for the purpose of multiplying, it should be desired to add a digit more than once at one key stroke.

It will also be perceived that if another key be struck while one of these rings is rotating, the second ring cannot start its rotation until the first one has ceased to turn. The first ring stops when the shoulder 82 reaches the position shown in Fig. 15 and it is not until that time that the second ring can begin to turn. It will thus be seen that it is practically impossible for two of these rings to be in rotation at once unless the operator has struck two keys so nearly together that they could not print correctly. If the typewriter is correctly operated no two transmitting rings can interfere with each other.

In order to prevent any ring from dropping down when it has about half completed a rotation, any suitable means can be provided. In the present instance I have shown a series of fingers 92 lying beneath the rings 83 in position to prevent them from dropping down any lower than shown in Fig. 16. These rings project from a comb plate 93 secured to the cross bar 64.

As each of the pins 85 projects over one of the letter printing key levers 15, certain of said key levers have been formed with a downward curve 94, Fig. 11, leaving a cut-out 95 through which the pin can revolve without disturbing the key lever.

In order to enable the rings 83 to transmit electrical impulses, said rings are made of metal which, however, is cut out in certain places around the periphery of each ring and replaced with one long strip of insulating material 96 and several short strips 97 between which show cross strips or faces 98 of metal. The ring shown in Figs. 15 and 16 is the one that overlies the "9" key and there are nine of these metallic strips or faces 98 in this particular ring and in each of the other rings there is a number of said metallic faces corresponding to the numerical value of the key over which said ring lies and by which it is controlled. When the rings rotate electric circuits are completed through the metallic faces 98 and two brushes having, as here shown, the form of rollers 100 and 101, which normally rest on the long strip 96 of insulating material but which during the rotation of any ring alternately make contact with the insulating material and the metal faces 98, thus sending through each roller a number of electrical impulses equal to the number of said faces 98. It will be noted that the roller 100 stands behind the roller 101 a distance about equal to the width of one of these faces 98. The construction is such that the roller 100 first makes contact with the face 98 and at about the same instant that said roller 100 passes on to the next succeeding strip 97 of insulating material, the roller 101 makes contact with the strip 98. The circuit is therefore closed through these rollers alternately and not through the two rollers at the same time.

All of the rollers 100 are mounted in the forward ends of spring arms 102 which at their rear ends are secured by screws 103 against a strip of metal 104 lying along the underside of a bar of insulating material 105 which is secured to the front face of the cross bar 63. It will thus be seen that all of these rollers 100 are in electrical connection with the bar 104. This bar is connected with a binding post 106, Fig. 11, to which is secured one end of a wire 107, Fig. 13, which wire runs into the computing machine where it has connections that will be described in connection with the description of said machine.

Each of the rollers 101 is mounted on a spring strip 108 which at its rear end is secured by a screw 110 against a plate 111 which lies along the top of the bar 105 of insulating material. This plate 111 is provided with a binding post 112 to which is connected a wire 113 that runs into the adding machine. As the shaft 70 is run at a uniform speed, it will be perceived that the electrical impulses sent over the wires 107 and 113 will be sent at uniform intervals.

The denomination selecting mechanism of the adding machine is controlled by electric circuits including a series of wires 114, Figs. 26, 19 and 21, which wires are shown as grouped into a cable 115. If desired the wires 107 and 113 may be run into the same cable which can connect the typewriting machine with the adding machine. At the typewriting machine the wires 114 have their ends inserted in holes 116, Fig. 18, in the ends of screws 117, which screws serve to secure a series of flat springs 118 in position on top of a block 120 of insulating material. Said insulating block is mounted on the stationary framework of the typewriter, back of the carriage, being secured at one side to a strip of sheet metal 121, which in turn is secured to the upper rail 5 by screws 122 and being also secured to a plate 123 which by means of screws 124 is secured to the stationary framework 36 of the tabulator mechanism. The construction is such that the block 120 of insulating material overlies the denominational stops 33 and the column stop bar 30. A series of holes are bored vertically through this block of insulating material above the column stop bar, said holes being staggered in order to make them of suitable size and at the same time to get the spacing thereof equal to that of the letter space feed of the carriage. One of these holes is shown in vertical section in Fig. 19 where it will be seen that in the bottom part of the hole there is a bushing 125 through which projects a pin 126 which pin has thereon a collar or flange 127 that overlies the top of the bushing 125 and limits the downward motion of the pin. The upper part of the pin passes through a second bushing 128 which guides said upper part of the pin and it will be observed that there is between the two bushings a vertical space sufficient to allow of a limited up and down motion of the pin 126. Each of these pins 126 has its upper end in contact with and pressed downward by one of the springs 118 and each of said pins is therefore in electrical connection with one of the wires 114 and it will be noted that said wires and pins are insulated from one another and from the framework of the typewriting machine. The springs 118 are extended alternately in a front direction and in a back direction from the pins 126 in order to provide more room for said springs. I prefer to cover the whole top of the insulating block 120 with a sheet metal casing 129 having an opening through which the cable 115 passes.

The lower ends of the pins 126 are beveled off as shown and they lie in the paths of the beveled upper edges 130 of the column stops 32. An adding column can be located or defined at any desired position across the paper by suitably locating one of the column stops 32 which when mounted on the bar 30 can be controlled by the denominational stops 33 to arrest the typewriter carriage in any denominational position within the column. At the same time when the column stop is passing through the field of control of the stops 33 it is also passing beneath the series of pins 126 and whenever the carriage stands in any denominational position within such column the stop 32 will have its upper edge in electrical contact with the corresponding one of the pins 126 and therefore in electrical connection with the appropriate one of the wires 114, which wires extend in the adding machine to denomination selecting devices which will be described hereinafter.

A plurality of registers is necessary to accomplish some of the objects of the present invention, five registers being shown in the present instance, and the particular one or more of these registers to be operated is automatically selected by the typewriting mechanism through electrical connections including wires 131, 132, 133, 134 and 135, which wires are preferably gathered together into the cable 115. The wires 131—135 have their ends at the typewriter connected to screws 136 threaded into a depending branch or plate 137 of the block 120 of insulating material that hangs down behind the rail 5 and the typewriter carriage and in front of the bar 30. Each of the screws 136 has connected thereto a wire 138, each of which passes along one of a series of horizontal grooves 140 cut in the rear face of the insulating plate 137. Lying in the grooves 140 and connected respectively with the wires 138 are a series of register selecting devices which here have the form of contact bars 141, 142, 143, 144 and 145, which bars it will be noted are respectively in electrical connection with the wires 131 to 135 inclusive. Each of the column stops has projecting forward therefrom one or more register selecting lugs 146 as shown in Figs. 19 and 22-25.

As best shown in Fig. 20 each of the bars 141—145 has threaded into it two headed screws 147 which pass loosely through holes in the plate 137, and each of which is surrounded at its rear part with a light compression spring 148 seated in an enlargement of the hole through which the screws pass. The parts are so constructed and arranged that the contact bars are pressed lightly toward the rear by their springs but they can be cammed forward a little by the lugs 146, for which purpose the ends of the bar are beveled off as shown in Fig. 20. These contact bars are here shown all of the same length and all in different lines parallel with the travel of the carriage. It will, of course, be understood that it may sometimes be desirable to make some of said bars of different lengths and to arrange two or more of them end to end.

It will be perceived that when the carriage is passing through an adding zone defined by any one of the column stops 32 that said column stop is through its lug or lugs 146 in electrical connection with one or more of the wires 131—135, depending upon the number and location of the lugs with which that particular column stop is equipped. By suitably disposing these lugs, therefore, the numbers written in different columns can be added on different registers or on the same register or they can be added on different registers and also all on a grand total register and various combinations can be used. Two examples of this sort are shown in the drawings. In Fig. 19 five column stops are shown provided each with one lug 146 and these lugs are at different heights so that they all contact with different bars 141—145. In Figs. 22-25 there is shown a set of four column stops all of which have lugs 146 in position to contact with the lowermost bar 145 and each of which has besides this another lug 146 adapted to contact with one of the other bars, these latter lugs being different on all of the different stops. By using this set of stops four adding columns can be defined and numbers written in the several columns will be added on separate registers whereas all of the numbers in all of the columns will be added on a grand total register controlled by the bar 145. It will of course be understood that other combinations can be used and in fact almost any combination desired can be arranged to suit the particular work that the operator has on hand. Other variations in the connections can be made by certain switches in the adding machine which will be described later on.

It will be perceived that the electrical connections on the typewriter are adapted to transmit a series of electrical impulses appropriate to the number written on the typewriter, that said devices are adapted to close in succession circuits appropriate to the successive denominational positions of the typewriter carriage in an adding column and also circuits adapted to select a register or registers for the different columns of numbers. For some of the purposes of my invention the adding or other registering mechanism controlled by the various wires 107, 113, 114 and 131—135 may be of any suitable description as long as it is adapted to register numbers in accordance with the number of impulses sent over the wires 107 and 113 and in denominations selected by the wires 114 and on registers selected by the remaining wires. I have, however, devised a novel adding machine of the character specified, which machine in the present instance is shown separate from the typewriting machine and connected with it only through the wires above mentioned.

The adding machine has a casing 150 of irregular form within which the mechanism is inclosed and by which it is supported. The machine contains a series of register operating devices, one for each denomination, said denominational register operating devices in the present instance consisting of segmental racks 151, said racks being pivoted side by side on a transverse rod or shaft 152 supported in the casing 150. As shown in Fig. 3 each of the racks 151 has a hub 153 journaled on said shaft 152, and the series of hubs are kept from motion endwise of said shaft by collars 154, suitably secured on the rod, as for example, by set screws. There is one of the racks 151 for each denomination to be registered, ten such racks being shown in the present instance to correspond with the ten pins 126, each of which pins controls one of said racks. The racks 151 are normally in their rearmost position, indicated in Fig. 2, to which position they are moved by weights 155 mounted or formed on the rear ends of said racks and located back of the rod 152 and sufficiently heavy so that said weights, when the racks are released from other forces, will move the racks back to normal position where they are arrested by a cross rod 156.

The racks 151 are operated by means of coiled springs 157, one such spring being provided for each rack to which its upper end is pivoted at 158. The lower ends of all the springs 157 are connected to a cross rod 160, Figs. 2 and 4, which rod constitutes the yoke bar of a yoke frame having side arms 161 each consisting of a bell-crank pivoted at 162 to a bracket or supporting piece 163 secured against the front wall of the casing 150 near the bottom of the machine. Each of the bell-cranks 161 has a depending arm to which is pivoted an approximately horizontal link 164, the rear end of which is pivoted at 165 to a T-frame 166, which is pivoted at 167 to a bracket 168 constituting part of the frame piece 163. An electromagnet or a pair of electromagnets 170 are secured at their forward ends to the frame piece 163 and they have armatures 171 mounted on or forming part of the frame 166. The motion of said armatures and frame away from the magnets is limited by an adjusting screw 172 threaded through an arm 173 of the frame 166 and arranged to strike against the top of a post 174 extending upward from the bracket arm 168. A spring 175 is connected at one end with said bracket 168 and at the other end with the arm 173 to hold said arm and frame 166 in normal position. The springs 157 are close wound so that when in normal position they are not under any tension and the weights 155 are therefore sufficient to restore the racks 151 to normal position. When the circuit is closed through the magnets 170, however, the armatures 171 are drawn toward said magnets, their motion being communicated by the links 164 to the bell-cranks 161, causing the bar 160 to be moved down a sufficient distance to put the springs 157 under tension and so that said tension will continue through a motion of each of said racks of eighteen teeth, said racks having a motion of two teeth for each unit to be registered.

The circuits through the magnets 170 are controlled by the contact bars 141–145 and lugs 146 in a manner that can perhaps be understood from Fig. 26 and which will be more fully explained hereinafter. The construction is such that current flows through the magnets 170 during the entire time when the typewriter carriage is in an adding column so that during that time the springs 157 are under tension. It will be noted that depending arms of the bell-cranks 161 are short compared with the horizontal arms of said bell-cranks and that the springs 157 are connected with the racks 151 near the pivots of said racks. The points 165 at which the links 164 are connected with the frame 166 are also farther from the pivot 167 than the armatures 171 are. Altogether the racks have a sufficiently high leverage on the armatures so that said armatures are capable of imparting to said racks their maximum movement of eighteen teeth.

The differential mechanism for controlling the motion of the racks 151 includes escapement devices comprising a series of steps 176 formed on the forward part of each of the rack segments and on the lower edges of said segments. The steps 176 of each segment are engaged by an adjusting screw or stop 177 threaded through ears 178 bent off from a horizontal rack bar 180.

The stop 177 can be adjusted as to height by turning it and it can be secured in adjusted position by lock nuts 181. It will be observed that this stop normally stands beneath the lowermost one of the steps 176 and that if said stop 177 be drawn toward the rear it will allow the rack segment to drop down a distance equal to one of the steps 176 for each unit of motion of the stop 177 toward the rear. The angular distance between two consecutive steps 176 is equal to two teeth of the rack. It will of course be understood that the steps like 176, could be on the bar 180 and the coöperating device on the rack 151, instead of the arrangement shown.

The rack bars 180 are all mounted on a cross rod 182, which rod passes through elongated slots 183 formed in said bars, said slots being of a sufficient length to allow of the bars moving forward nine increments or units of motion. The normal position of the bars longitudinally is determined by the forward ends 184 thereof which ends are formed as stops that normally rest against the front plate of the casing 150.

Each of the bars 180 has on its upper edge near the rear end thereof rack teeth 185 adapted to mesh with a pinion 186 mounted on a transverse horizontal shaft 187 which at its ends is journaled in the framework or casing 150. As shown in Fig. 3 there is a series of ten of these pinions 186, one of them overlying each of the rack bars 180 and all of them rigidly secured to the shaft 187 as by pins 188. Means are provided for turning the shaft 187 differentially as will hereinafter appear.

Figure 2:
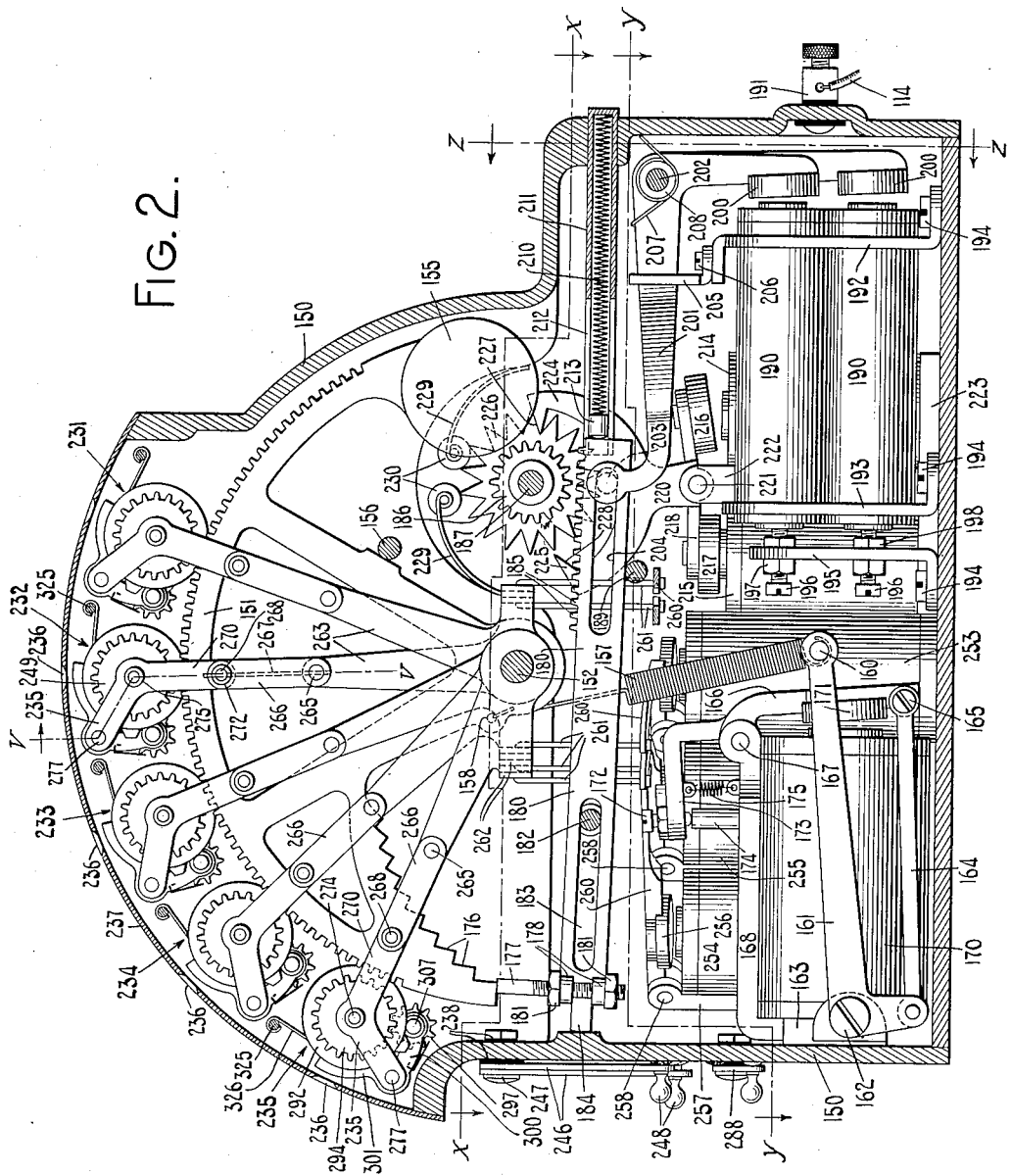
Fig. 2 is a right-hand side elevation of the mechanism of said machine, parts being shown in transverse vertical section just inside the right-hand wall of the frame or casing, and some of the parts being shown in section on other planes as has been found convenient.
Figure 3:
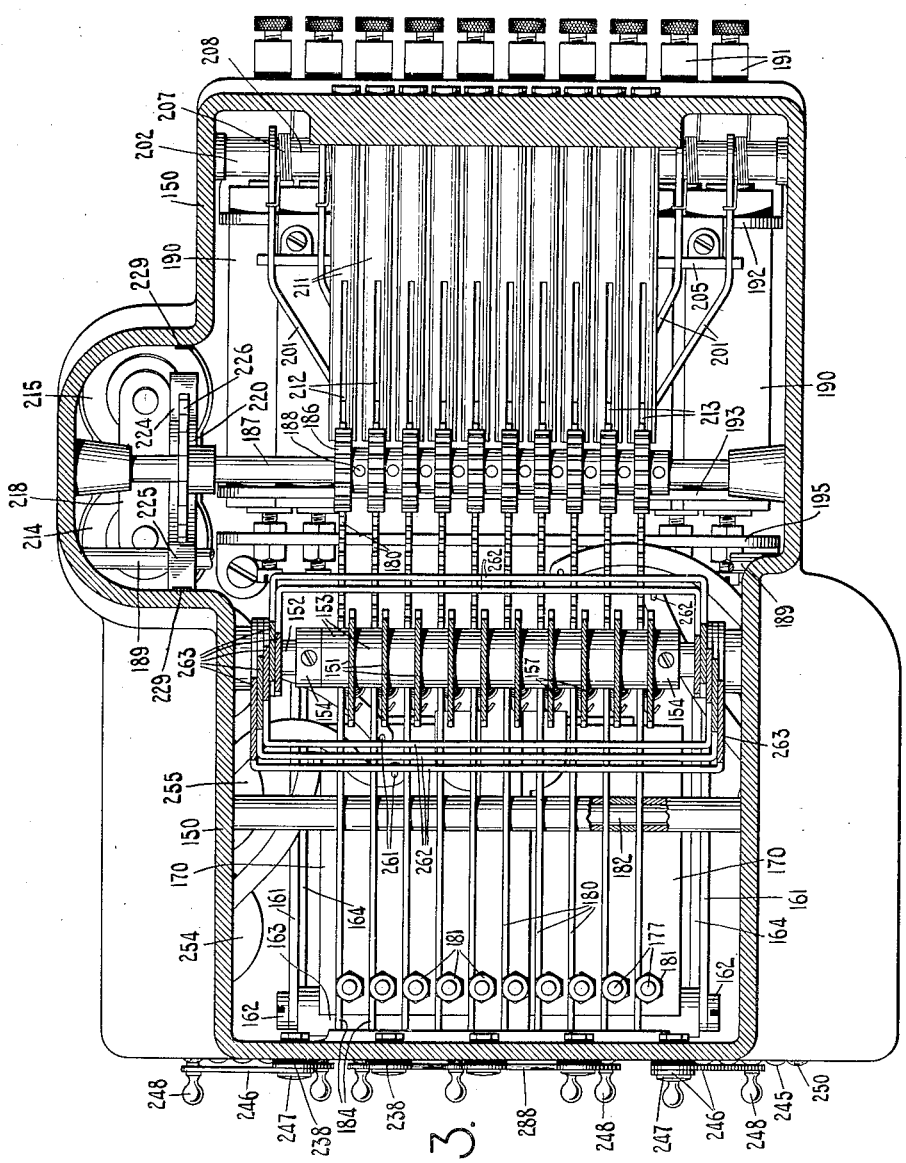
Fig. 3 is a top plan view of part of the mechanism in section about on the line $x$—$x$ of Fig. 2.

The racks 180 are normally depressed out of engagement with their pinions 186 as shown in Fig. 2, the downward motion of the bars 180 being limited by a fixed crossrod 189. These racks are elevated into engagement with said pinions by selective means including a series of ten electromagnets 190, one magnet for each rack bar. Said magnets are in circuit with the wires 114 as indicated in Fig. 26, said wires being connected with binding posts 191, Figs. 2 and 3. As here shown, the magnets 190 are mounted in holes formed in frame plates 192 and 193 which plates are secured to the base of the casing 150 by screws 194. Another plate 195 similarly secured to the base of the machine, is situated in front of the forward ends of the magnets 190, and screws 196 passing through said plate and threaded into the cores of said magnets, have nuts 197 and 198 thereon on opposite sides of the plate 195 and by adjusting said nuts each of the magnets can have its rear end adjusted properly with relation to its armature 200. The magnets 190 and the armatures 200 are preferably arranged in the staggered fashion shown in Fig. 5, the armatures being mounted on the depending arms of bell-cranks 201, which bell-cranks are pivoted on a cross bar 202 and each of said bell-cranks has at its forward end a headed pin 203, Figs. 2 and 4, that passes through an elongated slot 204 in the forward end of one of the rack bars 180. The construction is such that when the circuit is completed through one of the magnets 190 the corresponding rack bar 180 is moved into engagement with its pinion 186 and therefore into position to be operated by the shaft 187, such operation consisting of a longitudinal motion of the bar toward the rear of the machine through a distance depending upon the numerical value of the operated typewriter key. As the bar 180 moves toward the rear the steps 176 follow the stop 177 with the result that said steps are in a position to prevent for the time being the return of the bar 180 to its normal forward position even when said bar is dropped down again out of engagement with the pinion 186. As the magnets 190 are in circuit with the pins 126 of the typewriter it will be perceived that the bars 180 will be moved one after another into gear with the shaft 187 as the typewriter carriage moves through an adding zone.

The motion of the armatures 200 is limited by the cores of the magnets and it is for this reason that the adjusting screws 196 are provided. The adjustment of one of these screws regulates the extent to which the rack teeth 185 move into engagement with the pinion 186.

The horizontal arms of the bell-cranks 201 are guided by a comb plate 205 secured by screws 206 to the plate 192. Each of said bell-cranks is also provided with a returning spring 207 coiled about the hub 208 of the bell-crank and at one end engaging one arm of the bell-crank and at the other end engaging the stationary framework.

Figure 5:
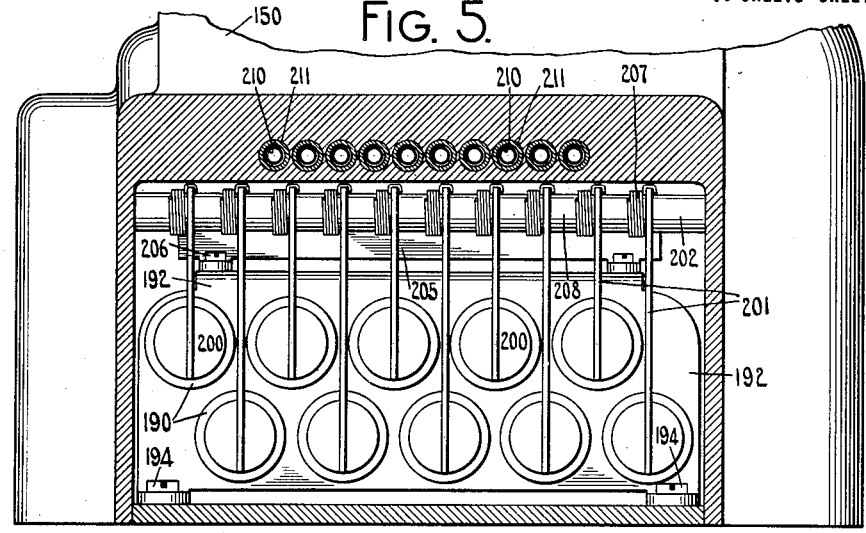
Fig. 5 is a front elevation of part of the mechanism, parts being shown in section about on the line $z$—$z$ of Fig. 2.

The racks 180 are provided with restoring springs 210 to move them longitudinally back to normal position at the end of an adding operation. These springs are coiled compression springs each mounted in a tube 211 closed at its rear end and each of said tubes is inserted in a bore in the rear wall of the casing 150 as shown in Figs. 2 and 5. Each of said tubes 211 has a vertical slot 212, Figs. 2 and 3, extending far enough to admit of the necessary amount of longitudinal motion of the rack 180, which rack has its rear end in said slot. A short pin or plunger 213, Fig. 2, is interposed between the end of the rack bar and the end of the spring. The construction is such that when the rack bar is moved up and down by the bell-crank 201 its end slides across the end of the plunger 213 and when the rack bar is moved toward the rear by the shaft 187 it compresses the spring 210 and when the racks 151 are finally restored to normal position by the weights 155, the springs 210 expand, moving the rack bars toward the front of the machine to their normal positions.

The shaft 187 is rotated through differential distances by means of an escapement device, or rather, a force feed device operated by the electrical impulses transmitted over the wires 107 and 113. The wire 107 leads to an electro-magnet 214, and the wire 113 to an electro-magnet 215 these two magnets standing upright in one side of the casing beneath the shaft 187, and the magnet 215 standing in front of the magnet 214. The magnet 214 has an armature 216 and the magnet 215 has an armature 217, said armatures being secured to the opposite arms of a lever 218 of the first order, said lever being formed integral with or constituting part of a rocker frame 220 which is pivoted at 221 in brackets 222 extending upward from a base plate 223 on which the magnets 214 and 215 are mounted. The rocker 220 and connected parts normally stand in the position shown in Fig. 2 where it will be seen that the armature 217 is down and the armature 216 stands up above its magnet. When through the rotation of a ring 183 the circuit is closed through the roller 100 and wire 107, the magnet 214 is energized causing the rocker 220 to rock toward the rear of the machine. As soon as the metallic face 98 passes out of contact with the roller 100 and into contact with the roller 101 the circuit is broken through the magnet 214 and closed through the magnet 215 so that the rocker is forcibly rocked in the opposite direction. It will thus be seen that each of the metallic faces 98 causes a complete oscillation back and forth of the rocker 220. Said rocker includes two branches or palettes 224 and 225 which are adapted alternately to engage a star wheel 226 fixed on the shaft 187. The palette 224 has an inclined upper edge 227 and the palette 225 has an inclined lower edge 228 adapted to engage the teeth of the wheel 226 in such fashion that each complete oscillation of the rocker 220 causes said wheel and the shaft 187 to turn toward the front of the machine a distance equal to one tooth of the star wheel, which star wheel has the same number of teeth as each of the pinions 186.

Two plate springs 229 carry two detent rollers 230 which engage the points of the teeth of the wheel 226, said detents being so arranged that when one of them is in engagement between two teeth the other is poised on top of the tooth substantially in dead center position. These rollers are therefore adapted to retain the wheel yieldingly in positions spaced about a half tooth space distance apart, the rear roller normally engaging the wheel between teeth, and the forward roller engaging the wheel between teeth when the palette 225 has moved said wheel about a half tooth distance.

Figure 1:
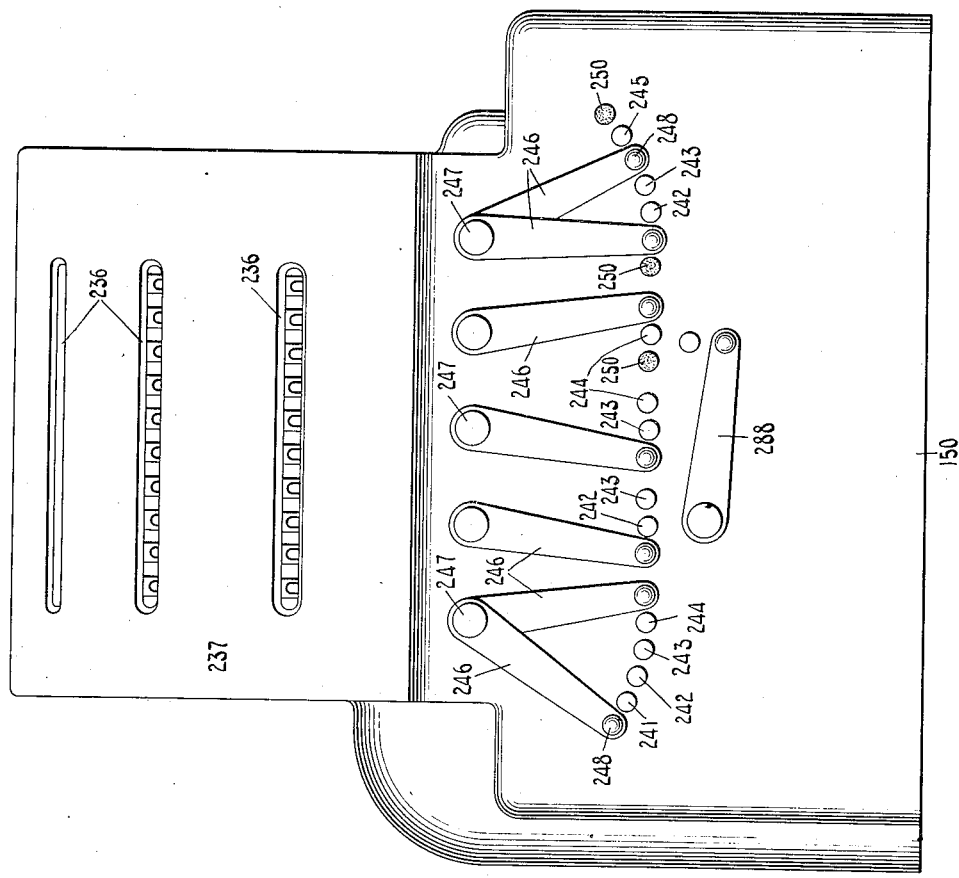
Figure 1 is a front elevation of the computing machine.

The adding machine contains five registers which in Fig. 2 I have designated in a general way by the five numerals 231, 232, 233, 234 and 235. These registers it will be observed are disposed around the series of racks 151 in such position that any one or more of the registers can be drawn down into engagement with said racks, said registers, however, normally standing up out of engagement as shown in Fig. 2. These registers can be read through sight-openings 236 formed in a curved casing plate 237, Figs. 1 and 2.

The front wall of the casing 150 supports a series of switches to control the devices by which the register or registers to be operated are selected. In the switch-board thus formed, the wires 131—135 terminate in buttons or contacts which may be variously disposed but in the specific arrangement here shown the wire 131 terminates in two buttons 241, the wire 132 in three buttons 242, the wire 133 in four buttons 243, the wire 134 in four buttons 244, and the wire 135 in two buttons 245, all as will be understood by comparing Figs. 1 and 26. These series of buttons or contacts are arranged for co-operation with a series of switches 246 consisting of arms of resilient metal pivoted at 247 to the front plate and each provided with a handle 248 for manipulating it. A number of dead buttons or contacts 250 are provided to throw any one of the switches out of use. It will be observed that the two end pivots 247 have each two switches 246 mounted thereon so that each of these pivots is capable of connection with two of the wires 131—135 at a time. The buttons 241—245 and the pivots of the arms 247, are suitably insulated from the casing, as by sleeves and washers 238 of insulating material. In the mechanical drawings, I have usually omitted to show the wires, whose disposition can be better understood from the electrical diagram, Fig. 26.

Figure 4:
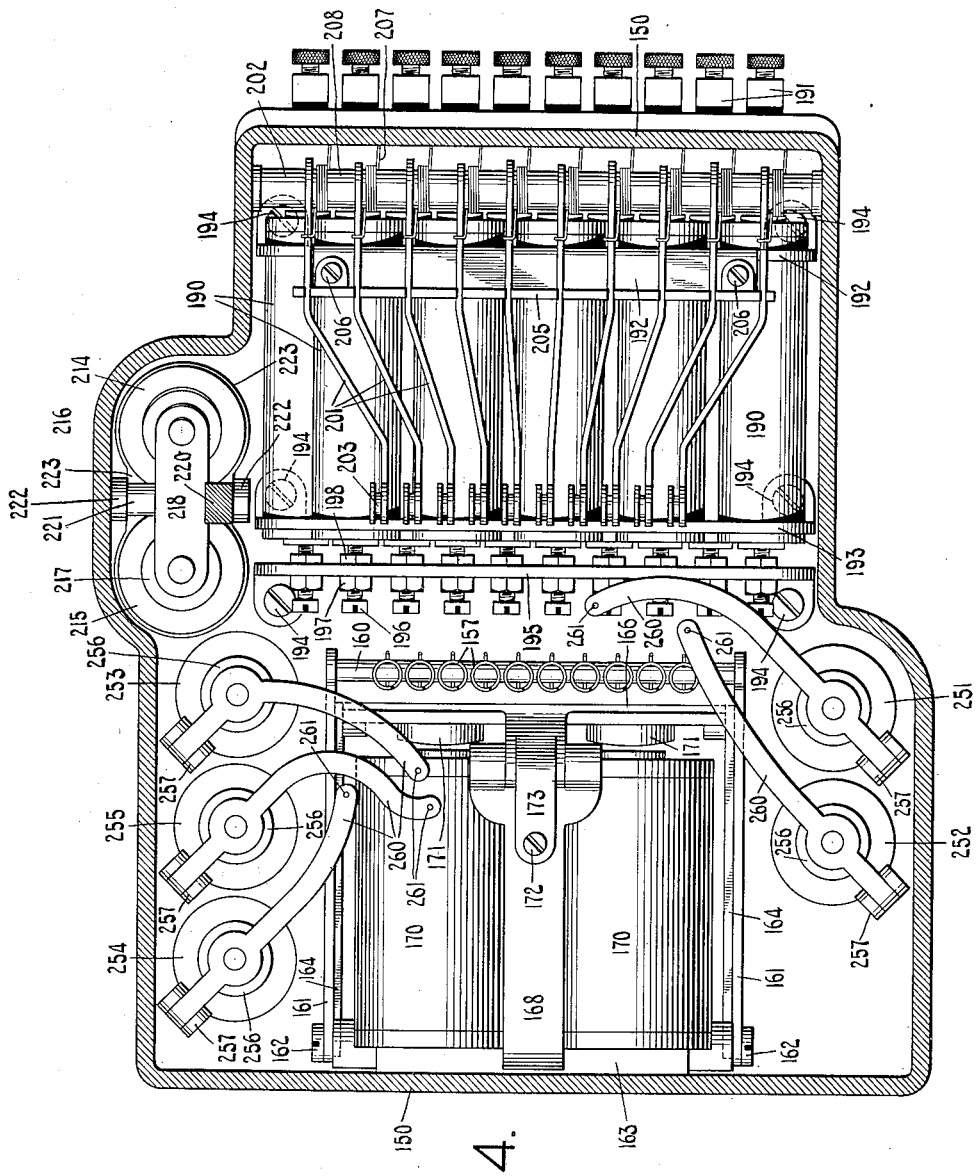
Fig. 4 is a top plan view of the mechanism in the bottom of the machine, parts being shown in section about on the line $y$—$y$ of Fig. 2.

Each of the pivots 247 is connected by means of a wire to one of five electro-magnets 251, 252, 253, 254 and 255, Fig. 4, which magnets stand vertically on the base of the machine and these several magnets have armatures 256 which are connected respectively with the registers 231—235 to draw said registers into engagement with the racks 151. For the sake of clearness, magnets 251 and 252 are omitted from Fig. 2. Each of the magnets 251—255 is connected with a frame piece comprising a bracket 257 to which at 258, Fig. 2, is pivoted a lever 260 of the third order, said lever having the armature 256 mounted thereon. The levers 260 are curved in the irregular fashion shown in Fig. 4 in order to bring their free ends into suitable positions and at said free ends each of said levers has connected thereto the lower end of a link 261, the upper ends of said links being connected with the cross bar 262, Figs. 2 and 3, of a series of five yoke-frames pivoted on the rod 152 at the ends thereof and nested in a manner which will be understood from Fig. 3. Each of said yoke-frames has at each end thereof and extending therefrom upward, or upward at a suitable inclination, an arm 263, Figs. 2, 3 and 6, each of which arms at its free end is pivoted by a pivot screw 264 to a stud 265, which stud is riveted to the free or inner end of a link 266, which link together with the arm 263 constitutes a toggle joint extending radially from the rod or shaft 152 in the general direction of one of the registers. This toggle is normally maintained in a straight position by means of a restoring spring 267, Figs. 6 and 2, which consists of a piece of spring wire passing loosely through the stud 265 and at its upper or outer end fixed in the head of a pivot 268 to which the upper end of the link 266 is pivoted. In addition to passing through the link 266 the pivot 268 has an enlarged part that passes also through the end plate 270 of the register frame, said pivot being so connected with said end plate that it cannot turn therein. The pivot 268 after passing through the end plate 270 and link 266 is prolonged to project into a radial slot 271 formed in the casing 150 and arranged to guide the register frame into and out of position where the register wheels mesh with the racks 151. Inside the link 266 and inside the slot 271 the pivot 268 has a collar 272 surrounding it and secured thereto by a pin 273.

As indicated in Figs. 3 and 6, the arms 263 are nested and it will be understood that the studs 265 are made of different lengths to bring this nesting about and at the same time to bring all of the links 266 over against the side wall or casing 150.

From the pivot 268 the end plate 270 of the register frame extends radially and the register wheel shaft 274 has its end reduced and passing through said plate 270, which plate is secured between the shoulder of said shaft and a collar 275 which surrounds the reduced end of the shaft to which it is secured by a pin 276. The collar 275 lies in the slot 271 so that the register frame plate 270 is guided by said slot at two points whereby the register is caused to move rectilinearly into and out of operative position.

It will be understood that the devices which have just been described are duplicated at the two sides of the machine and at the two ends of each register. The register frame comprises two end plates 270, the register wheel shaft 274 and another shaft or rod 277, which is mounted in the ends of the plates 270, which plates have the angular form shown in Fig. 3 so as to locate the shaft 277 farther away from the shaft 152 than the shaft 274 and forward of said shaft 274. The shaft or bar 277 is secured to the end plates 270 in any suitable manner as for example by inserting the reduced ends of the shaft through suitable holes in the end plates and riveting the shaft up as shown in Fig. 6.

The whole construction is such that when one of the armatures 256 is drawn down toward the core of its magnet the corresponding one of the yoke-bars 262 is drawn downward and the arms 263 at the two ends of said yoke-bar are moved toward the front of the machine or toward the back of the machine as the case may be, with the result that the register frame is drawn down or radially inward to bring the register into mesh with the racks 151, said register frame being guided in its radial movement by the collars 272 and 275 sliding in the slots 271

The electric circuits may include any suitable source of current, two feed wires 280, 281 being shown in the present instance in Fig. 26 as leading to the combined machine from said source of current. One or both of these wires may be provided with a main switch 282. The electrical devices may include if necessary a current reducing device here shown as a resistance coil 283. In the diagram shown in Fig. 26, which diagram will of course be varied according to circumstances, there are two wires 284 and 285 that lead to the motor 72 and that do not run through the resistance coil 283, which coil is interposed in the wire 286 that leads to the typewriter and adder circuits which have already been partially described in connection with the mechanism. A second switch 288 is shown in the diagram and in Fig. 1 the switch is shown as located in the casing plate at the front of the adding machine. One of the feed wires 290 is shown in Fig. 26 connected with one of the stationary rails 5 of the typewriter. In other words, this wire is connected with the stationary framework of the typewriter and the actual physical connection may of course be at any point. The shaft 70 may be included in this connection separately as indicated in Fig. 26 although no actual separate conductor is shown for the purpose in the mechanical drawings. It will, of course, be understood that it is also the intention that the typewriter carriage be included in the electrical connections to this wire. The connections from the wire 290 to the pins 126 and bars 141—145 are through the tabulator stop pieces 32 which are not indicated in Fig. 26. The return wire 291 is connected with the magnets 214, 215 and 190 and it is connected with the magnet 170 as indicated. The return wires from each of the magnets 251—255 go through the large magnets 170 which latter are therefore energized every time a current is sent through any one of the former. It will thus be seen that the magnet 170 and some one or more of the magnets 251—255 will be energized during all of the time when any one or more of the bars 141—145 is in contact with one of the lugs 146, provided of course the switches 246 are appropriately set.

With the electrical devices connected up as shown in this diagram but with the switches 282 and 288 closed, the motor 72 would run continuously. When the typewriter carriage moves into an adding column one or more of the magnets 251—255 would immediately be energized together with the magnets 170; this last would put all of the springs 157 under tension and the other magnets would draw one or more of the registers into operative position. Meanwhile some one of the magnets 190 would be energized, depending upon the denominational position of the carriage, thus causing one of the racks 180 to mesh with its pinion 186. When a numeral key is struck the ring 83 will drop down and send a succession of impulses through the magnets 214 and 215, causing the shaft 187 to turn a distance proportional to the numerical value of the operated key and drawing the engaged one of the racks 180 a corresponding distance toward the rear and allowing the corresponding rack 151 to be moved by its spring 157 to add the number.

It will, of course, be understood that, by making suitable changes, the register could be thrown into mesh after the racks were set, and said registers be operated by the return movements of said racks, as is common in many adding machines.

The registers here shown are all alike and are of novel construction, which will be best understood by reference to Figs. 2 and 6-10. Each of said registers comprises a series of register wheels 292 strung along the shaft 274, collars 293, Fig. 6, being mounted on said shaft to hold the wheels in place. The numeral 292 is applied specifically to a drum having the ten digits on its periphery and each of said drums has a twenty-toothed gear wheel 294 secured, as for example by rivets 295, to its right-hand face. In the case of each wheel above that of lowest order there is another similar gear wheel 296, Fig. 7, loosely mounted on the shaft just at the right of the gear 294 and it is this gear or pinion 296 that is adapted to mesh with the rack 151. In the case of the wheel of lowest order, the rack meshes directly with gear 294. Motion is ordinarily transmitted from the gear 296 to the gear 294 and drum 292 by means of a small pinion 297 journaled on a stud 298, Fig. 7, projecting from an arm or lever 300 which has the general form of a bell-crank and is pivoted on the shaft or rod 277. This arm 300 is made movable to withdraw the pinion 297 from engagement with the gears 294 and 296 in order to enable a transfer to be effected, the reason for this being that in this machine the register wheels at the time when they are being operated are all in engagement with the racks 151 and in case of transfer it is necessary to have some means to release the wheels from said racks in order to enable them to be turned independently of the racks. In order to hold the pinion 297 normally in mesh with both gears 294 and 296 the bell-crank 300 has an arm 301 from which a tooth 302, Fig. 8, projects toward the shaft 274 and said tooth normally rides on the smooth circular periphery of a disk 303 secured, as by a pin 304, Fig. 7, to the next wheel 292 to the right. At the instant when said next wheel should begin a transferring operation a notch 305 in the disk 303 reaches the tooth 302, as shown in Fig. 8, allowing said tooth to drop down to a position to move the pinion 297 out of engagement. Said pinion is positively moved out of engagement at this time by means of a tooth 306 projecting from the wheel 292 of lower denomination, which tooth engages the projecting end 307 of the pin or stud 298 on which the pinion 297 is journaled. The tooth 306 has inclined edges that act to cam the arm 300 and with it the pinion 297 away from engaging position as will be understood from Figs. 8 and 9. This latter figure shows the parts in the act of transferring from one wheel to another, the operation of transfer being somewhat less than half completed in this figure.

The devices that have been described only permit a transfer to be effected. The transfer is actually effected by means including a sliding member 308 that surrounds a reduced part 310 of the drum 292, as will be understood by comparing Fig. 7 with Figs. 8, 9 and 10. The opening in the member 308 is elongated, as shown, to admit of a limited amount of radial motion of said member. The member 308 includes an arm 311 on the right-hand face of which is a tooth 312 normally out of engagement with but adapted by radial movement of the member 308, 311 to be moved into engagement with a wheel 313 secured to the left-hand face of the register wheel of lower order. In Fig. 7, this wheel is shown secured by the same rivets 295 that secure the gear 294 in position. It will be perceived that a radial movement of the member 308 is adapted to lock said member to the register wheel of lower order by moving the tooth 312 into engagement with the teeth of the wheel 313. This wheel is here shown as a gear having a complete set of teeth, but that is not essential. The necessary radial movement of the member 308 is imparted thereto by the arm 301 through which a bracket 314 of said member 308 passes, as clearly shown in Fig. 7. Said bracket passes through a cut-out or slot 315 in the arm 301, the construction being such that when the said arm is in its normal position shown in Figs. 7 and 8 the sliding member is in its outer position whereas when said arm is rocked to its transfer position, shown in Figs. 9 and 10, the slide moves to its inner position with the tooth 312 in engagement with the gear 313. This same inward movement causes a second tooth 316 formed on the bracket 314 to be moved into engagement with the gear 294 of the wheel of higher order. The bracket 314 has a cut-out 317, Fig. 7, which, when the slide is in its inner position, straddles the gear 296, which gear is at the time locked against motion by the rack 151. The whole construction is such that when the gear of lower order moves from its "9" to "0" position it carries with it the gear 294 of the wheel of higher order, which gear is at the moment unlocked from the wheel 296. The lever 300, 301 is restored to its normal position by means of the inclined edge 318 of the notch 305 engaging the correspondingly inclined part of the tooth 302 at the end of the carrying operation, as shown in Fig. 10.

At the point in the operation just mentioned and indicated in Fig. 10, the gear 296 is standing still and the gear 294 is in motion and it is necessary for a tooth of the pinion 297 to move into mesh with both these gears. Thus to move a pinion into mesh with two gears, which gears are in relative motion at the time, requires that the tooth of the pinion should move with some exactness so as to enter the gap between two partially overlapping teeth of the two wheels, as will be understood from this figure. In order to guide the pinion 297 correctly a light wire spring 320 is secured in the arm 300 as shown and is adapted to bear against the teeth of the pinion 297. When this pinion is moved out of engagement it is turned by the spring 320 until one of the teeth of the pinion strikes against the end of the spring as shown in Figs. 9 and 10, which positions the pinion quite accurately to enable it to move into mesh as has been described.

When the parts are in the position shown in Fig. 10 the lever 300, 301 has already begun to move and the teeth 312 and 316 will presently begin to move out of engagement with their respective gears and by the time the operation is completed they will have moved entirely out of engagement. It will be seen, however, that before these teeth lose control of the gear 294 the pinion 297 will have one of its teeth in the act of wedging in between two teeth of said gear 294 and also between two teeth of the gear 296, which gear 296 is held in proper position by the rack 151. The tooth of the pinion 297 will therefore serve to insure that the transfer operation is properly completed.

The arm 311 of the slide 308 should of course normally lie in the end of the slot 315 in which it is shown in Fig. 8. During the transferring operation this member is rocked to the other end of said slot and at the end of said operation it is restored to its normal position by means of a spring 321 which at one end is secured to an arm 322 mounted on the member 308 and at its other end to an arm 323 mounted on the hub 324 of the lever 300, 301.

In order to prevent accidental motion of the register wheels during the time when they are disengaged from the racks, there is provided for each of the registers a horizontal bar 325 having a series of spring detents 326 projecting therefrom in position to engage the register wheels and retain them in their proper positions. These rods 325 are preferably fixed so that the springs 326 either do not follow the wheels all the way when said wheels are moved into engagement with the racks, or if so they follow them only with such diminished tension that the detents do not sensibly interfere with the rotation of the wheels.

Any suitable means can be provided for setting the register wheels at zero. The wheels shown in the drawings can be so set either manually or by adding a number equal to the complement of that indicated on the register.

By the employment of two brushes 100 and 101 and two electro-magnets 214 and 215, the shaft 287 can be operated much more rapidly than it could by a single magnet and returning spring. In the case of the single magnet all of the energy for moving the palettes in both directions would have to be sent in a single impulse whereas by the present construction each electrical impulse has only to oscillate the palettes and does not have to put a returning spring under tension.

The machine described can be used for a great variety of work, as will be understood, by suitably disposing the register selecting lugs 146 and suitably setting the switches 246. A great variety of combinations can be effected, and it will, of course, be understood that the switches 246 can be changed if necessary in the course of the work. For example, if it is desired to keep a continuous record of all the transactions, entered in the first columns of a series of sheets, this record could be kept on the 5th register 235. This could be done either by the use of a column stop like one of those shown in Figs. 22–25 and setting the first switch 246 to connect the magnet 251 with whichever one of the wires 131—134 the column stop employed was adapted to control, and the switch 246 for the magnet 255 would be set on the contact 245 to connect with the wire 135. This could also be done by the use of a column stop having only one lug 146 controlling one of the wires 131—135. All of the switches 246 would be set on dead points 250 except one which would be connected with the wire that was controlled by the column stop. This would give the total of the column of figures on the individual sheet and when this total was to be written at the foot of the column the switches 246 could be changed to connect the wire with the last magnet 255 so as to add the total on the register 235. The other register could then be cleared for the writing of another bill and again connected up for operation and the register 235 disconnected. When the total of this second bill was obtained, it would also be added on the register 235 and so on, so that at the end of the writing of a series of bills, the grand total of them all would appear on said register 235.

For another example, it may be that the first four totalizers are in operation for column addition for debit records. The fifth totalizer is used as a continuous register for all credit items. When a credit record is made in any column the switch 246 ordinarily employed in connection with that column is thrown on the dead point and the switch 246 for the magnet 255 is thrown on the live contact corresponding with the one from which the other switch was just disconnected. The credit items will therefore be added on to the fifth register whereas the debit items will be distributed among the other four registers according to the positions where they are written on the paper.

It will of course be understood that various changes other than those specifically mentioned in the course of the description can be made in the details of construction and arrangement without departing from my invention.

What I claim as new and desire to secure by Letters Patent, is:—

1. In a typewriting and computing machine, the combination with typewriting mechanism including a typewriter carriage and typewriter printing instrumentalities; of computing mechanism including a series of register-operating devices, one for each denomination; means for automatically operating said devices in accordance with numbers, which numbers are also written by said typewriting mechanism; a plurality of registers common to said operating devices; and means controlled by said typewriter carriage for connecting said registers selectively with said operating devices, said connecting means including separate means extending from each of said registers and including a series of selectable devices, one for each register, said selectable devices disposed in separate paths with respect to the travel of the typewriter carriage, and cooperating devices each disposed in one of said paths.

2. In a typewriting and computing machine, the combination with typewriting mechanism including a typewriter carriage and typewriter printing instrumentalities for writing numbers in vertical columns; of computing mechanism including a series of register-operating devices, one for each denomination; means for actuating said devices in accordance with numbers written in all of said columns; a plurality of registers, one register for each column; means controlled by the typewriter carriage for connecting said registers selectively with said devices, said connecting means including separate means extending from each of said registers and including a series of selectable devices, one for each register, said selectable devices disposed in separate paths with respect to the travel of the typewriter carriage, and cooperating devices each disposed in one of said paths; an additional register; and means for automatically connecting said additional register with said devices to register thereon numbers written in a plurality of said columns.

3. In a typewriting and computing machine, the combination with typewriting mechanism including a typewriter carriage, typewriter printing instrumentalities, and tabulator mechanism for defining vertical columns of figures; of computing mechanism including a series of register-operating devices, one for each denomination; means for actuating said devices in accordance with numbers written in said vertical columns; a plurality of registers common to said devices; and selective means for connecting said registers with said devices, said selective means including separate means extending from each of said registers and including a series of selectable devices, one for each register, said selectable devices disposed in separate paths with respect to the travel of the typewriter carriage, and cooperating devices associated with said tabulator mechanism and each disposed in one of said paths.

4. In a typewriting and computing machine, the combination with typewriting mechanism including a typewriter carriage and typewriter printing instrumentalities; of computing mechanism including a series of racks, one for each denomination, means for automatically operating said racks in accordance with numbers, which numbers are also written by said typewriting mechanism, a plurality of registers common to said racks, and means controlled by said typewriter carriage for connecting said registers selectively with said racks, said connecting means including separate means extending from each of said registers and including a series of selectable devices, one for each register, said selectable devices disposed in separate paths with respect to the travel of the typewriter carriage, and coöperating devices each disposed in one of said paths.

5. In a typewriting and computing machine, the combination with typewriting mechanism including a typewriter carriage and typewriter printing instrumentalities for writing numbers in vertical columns; of computing mechanism including a series of racks, one for each denomination, means for actuating said racks in accordance with numbers written in all of said columns, a plurality of registers, one register for each column, means controlled by the typewriter carriage for connecting said registers selectively with said racks, said connecting means including separate means extending from each of said registers and including a series of selectable devices, one for each register, said selectable devices disposed in separate paths with respect to the travel of the typewriter carriage, and coöperating devices each disposed in one of said paths, an additional register, and means for automatically connecting said additional register with said racks to register thereon numbers written in a plurality of said columns.

6. In a typewriting and computing machine, the combination with typewriting mechanism including a typewriter carriage, typewriter printing instrumentalities and tabulator mechanism for defining vertical columns of figures; of computing mechanism including a series of racks, one for each denomination, means for actuating said racks in accordance with numbers written in said vertical columns, a plurality of registers common to said racks, and selective means for connecting said registers with said racks, said selective means including separate means extending from each of said registers and including a series of selectable devices, one for each register, said selectable devices disposed in separate paths with respect to the travel of the typewriter carriage, and coöperating devices associated with said tabulator mechanism and each disposed in one of said paths.

7. In a typewriting and computing machine, the combination with typewriting mechanism including a typewriter carriage, typewriter printing instrumentalities and tabulator mechanism for defining vertical columns of figures; of computing mechanism including a series of racks, one for each denomination, means for actuating said racks in accordance with numbers written in said vertical columns, a plurality of registers common to said racks, and selective means associated with said tabulator mechanism for connecting said registers with said racks, said connecting means including separate means extending from each of said registers and including a series of selectable devices, one for each register, said selectable devices disposed in separate paths with respect to the travel of the typewriter carriage, and coöperating devices each disposed in one of said paths, and said selective means being capable of connecting said registers one at a time or more than one at a time with said racks, as desired.

8. In a typewriting and computing machine, the combination with typewriting mechanism including a typewriter carriage, typewriter printing instrumentalities and tabulator mechanism for defining vertical columns of figures; of computing mechanism including a series of racks, one for each denomination, means for actuating said racks in accordance with numbers written in said vertical columns, a plurality of registers common to said racks, and selective means for connecting said registers with said racks, said selective means including separate means extending from each of said registers and including a series of selectable devices, one for each register, said selectable devices disposed in separate paths with respect to the travel of the typewriter carriage, and coöperating devices associated with said tabulator mechanism and each disposed in one of said paths, said selective means arranged to connect with said racks a separate register for each separate column and also a grand total register for all of said columns.

9. In a typewriting and computing machine, the combination with typewriting mechanism including a typewriter carriage and typewriter printing instrumentalities; of computing mechanism for registering numbers written by said typewriting mechanism and including a plurality of registers, each including a series of register wheels, a rack extending across said series of registers, and means for automatically connecting with said rack a register wheel of any predetermined one of said registers, said connecting means including separate means extending from each of said registers and including a series of selectable devices, one for each register, said selectable devices disposed in separate paths with respect to the travel of the typewriter carriage, and coöperating devices each disposed in one of said paths.

10. In a typewriting and computing machine, the combination with typewriting mechanism including a typewriter carriage, typewriter printing instrumentalities and tabulator mechanism for defining columns of figures; of computing mechanism for registering numbers written by said typewriting mechanism and including a plurality of registers, each comprising a series of register wheels, a rack extending across said series of registers, and selective means controlled by said tabulator mechanism for automatically connecting with said rack register wheels of different ones of said registers, said selective means including separate means extending from each of said registers and including a series of selectable devices, one for each register, said selectable devices disposed in separate paths with respect to the travel of the typewriter carriage, and coöperating devices associated with said tabulator mechanism and each disposed in one of said paths.

11. In a typewriting and computing machine, the combination with typewriting mechanism including a typewriter carriage and typewriter printing instrumentalities; of computing mechanism including a plurality of registers, each comprising a series of register wheels, a rack extending across said series of registers, means for actuating said rack in accordance with digits written by said typewriting mechanism, and selective means controlled by said typewriter carriage for connecting with said rack a wheel of a particular one of said registers selected in accordance with the position of the typewriter carriage, separate registers for different positions, said connecting means including separate means extending from each of said registers and including a series of selectable devices, one for each register, said selectable devices disposed in separate paths with respect to the travel of the typewriter carriage, and coöperating devices each disposed in one of said paths; and means for connecting with said rack a wheel of a grand total register in a plurality of such positions.

12. In a typewriting and computing machine, the combination with typewriting mechanism including a typewriter carriage, typewriter printing instrumentalities and tabulator mechanism, said tabulator mechanism comprising column stops and coöperating stops; of computing mechanism for registering numbers written in columns defined by said tabulator mechanism and including a plurality of registers, selective lugs on said column stops, and means controlled by said lugs for selecting the one of said registers on which a given number is to be registered, some of said column stops having a plurality of lugs whereby a given number is caused to be registered on a plurality of registers.

13. In a typewriting and computing machine, the combination with typewriting mechanism including a typewriter carriage and typewriter printing instrumentalities; of a series of register-operating devices one for each denomination; means controlled by the travel of said carriage for connecting said devices with the numeral printing typewriter keys automatically at predetermined points in the travel of the carriage; a plurality of registers; and selective means controlled by said carriage for causing said registers to be engaged with said operating devices either one register at a time or more than one at a time, as desired.

14. In a combined typewriting and computing machine, the combination with typewriting mechanism including a typewriter carriage and printing instrumentalities; of computing mechanism including a series of racks; means controlled by said carriage for automatically bringing said racks under the control of the numeral keys and for operating said racks one at a time in accordance with the values of the operated keys; a plurality of registers; selective means for engaging said registers with said racks; and means controlled by the travel of the carriage for causing all of said racks to be simultaneously restored to normal position.

15. In a computing machine, the combination of a shaft having gear teeth thereon, means for turning said shaft always in the same direction for addition through differential distances, a series of rack bars normally out of engagement with said shaft but adapted to be moved into gear therewith, means for moving said racks one at a time into gear with said shaft, and register wheels controlled by said racks.

16. In a computing machine, the combination of a register; a series of register operating racks; springs for moving said racks in one direction; a second series of racks; connections between the racks of the two series, said connections including a series of steps on each of the racks of one of said series and coöperating devices on the racks of the other series; a toothed shaft; means for turning said toothed shaft through differential distances; and means for moving the racks of the second series one at a time into gear with said shaft.

17. The combination with a carriage, of computing mechanism and power devices for operating said computing mechanism, said computing mechanism including a register, racks for operating said register, springs for operating said racks and means operated by said power devices and controlled by said carriage for putting said springs under tension to operate said racks when said carriage is in position for writing in a computing zone and relieving said tension to allow said racks to return to normal position.

18. The combination with a carriage, of computing mechanism including a series of racks, one for each denomination, power operated means for operating said racks, and electrical devices controlled by said carriage for connecting said racks one at a time with said power operated devices and holding each rack in such connection as long as said carriage stands in the corresponding denominational position.

19. The combination of computing mechanism comprising a register, racks for operating said register, a source of power for operating said racks, a differentially movable shaft, and escapement devices operated by said shaft one at a time and controlling the operation of said racks by said source of power.

20. In a computing machine, the combination of a register, a series of register-operating racks, springs for operating said racks, electrical devices for putting said springs under tension, escapement devices, one for each rack, for controlling the motion of said racks under the impulse of said springs, a single differentially movable device, and selective means for operating the several escapement mechanisms from said single device.

21. In a typewriting and computing machine, the combination with typewriting mechanism including a typewriter carriage, keys and printing instrumentalities, of computing mechanism including a series of racks, one for each denomination, a series of registers common to said racks, electrical means controlled by the typewriter keys and carriage for operating said racks in accordance with numbers written by said typewriting mechanism, and electrical devices controlled by said typewriter carriage for selectively bringing said registers into gear with said racks.

22. In a computing machine, the combination of a series of segmental racks, a series of registers arranged segmentally around said series of racks, and electrically operated toggles for drawing said registers into engagement with said racks.

23. The combination of a traveling carriage; a series of parallel contact bars each of a length corresponding to a plurality of letter spaces; selective devices arranged for contact with said bars during the time when, due to the travel of said carriage, said devices are respectively passing said bars; a plurality of registers for registering numbers; and electric circuits for bringing said registers selectively into action, said circuits including said selective devices and contact bars.

24. In a typewriting and computing machine, the combination of a traveling carriage, tabulator mechanism comprising one or more column stops and coöperating stops; a series of parallel contact bars; selective devices on said column stops arranged for contact with said bars during the time when the several column stops are respectively passing said bars; computing mechanism for registering typewritten numbers; and electric circuits for controlling said computing mechanism, said circuits including said column stops and bars.

25. In a computing machine, the combination of a traveling carriage; computing mechanism including a plurality of registers, and means whereby said registers are caused to register numbers in a plurality of columns, said means including operating devices for said registers, a plurality of bars parallel with the travel of said carriage, means for engaging said bars selectively as said carriage travels through a computing zone, and electric circuits controlled by said bars and engaging devices and controlling the engagement of said registers with said operating devices.

26. In a computing machine, the combination of a traveling carriage, tabulator mechanism, said tabulator mechanism including adjustable column stops, computing mechanism for registering numbers, said computing mechanism including a plurality of registers and operating devices therefor; a series of bars, each parallel with the travel of said carriage; selective devices associated with said column stops for engaging said bars as the carriage travels through a computing zone; and means controlled by said bars and engaging devices for controlling the engagement of the several registers with said operating devices.

27. In a computing machine, the combination of a traveling carriage, tabulator mechanism comprising column stops and coöperating stops; computing mechanism for registering numbers, said computing mechanism including a plurality of registers and operating devices therefor; a plurality of bars, each lying parallel with the travel of the carriage; lugs on said column stops for engaging said bars selectively; and means controlled by said lugs and bars for controlling selectively the engagement of said registers with said operating devices.

28. In a computing machine, the combination of a traveling carriage, a tabulator mechanism comprising column stops and coöperating stops, computing mechanism including a plurality of registers and operating devices therefor; a plurality of contacts arranged parallel with the travel of said carriage; contacts on said column stops for engaging said parallel contacts selectively; and electric circuits in which said contacts are included, said circuits arranged to control selectively the engagement of said registers with said operating devices.

29. In a computing machine, the combination of a traveling carriage; tabulator mechanism comprising column stops and coöperating stops; computing mechanism for registering numbers, said computing mechanism including a plurality of registers, electric circuits whereby said computing mechanism is controlled, said circuits including a series of contacts spaced apart and arranged to be engaged by a column stop as the carriage passes through a computing zone, said contacts being included in electric circuits that control the denomination selection in the computing mechanism, and said electric circuits also including register selecting circuits, said register selecting circuits including a plurality of bars and lugs on said column stops for engaging said bars selectively.

30. In a computing machine, the combination of a traveling carriage; tabulator mechanism comprising column stops and coöperating stops; computing mechanism for registering numbers, said computing mechanism including a plurality of registers, means for operating said registers, register selecting devices and denomination selecting devices; a series of contacts to be engaged one after another by a column stop as said carriage passes through a computing zone, said contact devices being common to all of said stops and controlling said denomination selecting means; and a second series of contact devices arranged to be engaged by said column stops and controlling said register selecting means; and means whereby said column stops engage said second series of contacts selectively.

31. In a computing machine, the combination of numeral keys, a typewriter carriage; computing mechanism for registering numbers written by said typewriting mechanism; and connections from said numeral keys to said computing mechanism comprising electric circuits, a continuously moving part, and means for controlling said circuits, said controlling means comprising a series of devices, one for each of said numeral keys and arranged to be moved by the actuation of said keys into position to be operated by said continuously moving part.

32. In a computing machine, the combination of numeral keys; a carriage; computing mechanism; means including electric circuits for connecting said computing mechanism with said numeral keys, and circuit controlling means for said electric circuits comprising a continuously rotating shaft and a set of circuit controlling rings, one for each numeral key and each adapted to be operatively connected with said shaft by an operation of its key.

33. In a computing machine, the combination of a series of numeral keys, a carriage; computing mechanism, means connecting said computing mechanism with said numeral keys and including electric circuits, a continuously rotating shaft, a series of contact rings, one for each key and arranged to be moved by an operation of said key into position to be operated by said shaft; contacts coöperating with said rings; and means for automatically moving said rings out of engagement with said shaft.

34. The combination with a traveling carriage, and keys; of a continuously rotating shaft; a series of rings surrounding said shaft but normally out of operative engagement therewith; means for engaging the corresponding one of said rings with the shaft when one of said printing keys is operated; and an electric circuit controlled by said rings, said engaging means being of such character that the rings can engage the shaft at certain predetermined stages of the rotation of said shaft and cannot engage said shaft during certain other predetermined stages of such rotation whereby said rings cannot engage said shaft except at predetermined intervals.

35. The combination with a traveling carriage, and keys; of an electric circuit; a continuously rotating shaft; circuit controlling rings controlled by said keys, each of said rings surrounding said shaft; means whereby one of said rings is engaged with said shaft by the operation of the corresponding printing key; means for automatically disengaging said ring from said shaft after a predetermined extent of turning motion, said engaging means being of such character that said ring can be engaged therewith only at predetermined stages in the rotation of said shaft and such that a second ring cannot be engaged with the shaft until the first engaged ring is disengaged.

36. In a computing machine, the combination of a traveling carriage, keys including numeral keys; computing mechanism comprising two electro-magnets, a reciprocatory feed device operated in one direction by one of said magnets and in the other direction by the other of said magnets; electric circuits from said magnets to said typewriting machine, and circuit closers controlled by said numeral keys for closing said circuits alternately to cause a reciprocation of said feed device.

37. The combination of keys; a continuously rotating shaft; rings controlled by said keys and operatively connected with said shaft when said keys are operated, said rings having electrical contacts; two electric circuits having brushes coöperating with said rings, the brushes of one circuit being in advance of those of the other so that said circuits are closed alternately; two electro-magnets, one for each of said circuits, and a reciprocatory device operated by said electro-magnets.

38. The combination of keys, a continuously rotating shaft; rings controlled by said keys and operatively connected with said shaft when said keys are operated, said rings having electrical contacts, two electric circuits having brushes coöperating with said rings, the brushes of one circuit being in advance of those of the other so that said circuits are closed alternately; two electro-magnets, one for each of said circuits, a reciprocatory device operated by said electro-magnets; a register; and means for operating said register controlled by said reciprocating device.

39. The combination of a series of contact rings 83, each ring having one shoulder only, a rotary shaft 70 having a series of shoulders 82, one shoulder only for each ring, whereby said contact rings can be coupled with said shaft only when said shoulders are together, keys for controlling said rings, and electric circuits controlled by said rings.

40. The combination of a series of contact rings 83, each ring having one shoulder only, a rotary shaft 70 having a series of shoulders 82, one shoulder only for each ring, a series of key levers serving normally to hold up said rings, the construction and arrangement of the parts being such that the rings can drop down only at certain points in the rotation of the shaft, and means for automatically disconnecting the rings from the shaft.

41. The combination with the rotary shaft, contact rings and means for engaging said rings with said shaft, of disengaging means comprising a pin projecting laterally from each ring, a cam to engage said pin and draw the ring out of engagement, and a stop to arrest the pin, said cam terminating short of said stop to allow the ring to drop into engagement again at the next operation of said engaging means.

42. The combination with typewriting mechanism and computing mechanism; of a set of contact devices controlled by said typewriting mechanism; two brushes for each of said contact devices, one brush in advance of the other; an electric circuit common to all of the advance brushes, another electric circuit common to all of the other brushes; two electro-magnets, one in each of said circuits, and a reciprocatory device for controlling said computing mechanism operated by said electro-magnets.

43. In a computing machine, the combination of a plurality of registers, operating means therefor, electric circuits for controlling selectively the engagement of said registers with said operating means, and a switchboard for changing the connections of said electric circuits, said switchboard including means for bringing one of said registers under the control of a plurality of said circuits.

44. In a computing machine, the combination of a plurality of registers, operating means therefor, electric circuits for controlling selectively the engagement of said registers with said operating means, and a switchboard for changing the connections of said electric circuits, said switchboard including means for bringng a plurality of said registers under the control of one circuit.

45. In a computing machine, the combination of a plurality of registers, operating means therefor, electric circuits for controlling selectively the engagement of said registers with said operating means, and a switchboard for changing the connections of said electric circuits, said switchboard including means for bringing a plurality of said registers under the control of one of said circuits and for bringing one of said registers under the control of a plurality of said circuits.

46. In a typewriting and computing machine, the combination of a plurality of registers; operating means for said registers; means including electro-magnets for controlling selectively the engagement of said registers with said operating means; typewriting mechanism; electric circuits; circuit controlling means controlled selectively by said typewriting mechanism; and a switchboard for varying the connections of said circuits with said electro-magnets.

47. In a typewriting and computing machine, the combination of a plurality of registers; operating means therefor. means including electro-magnets for controlling selectively the engagement of said registers with said operating means; typewriting mechanism including printing instrumentalities and a traveling carriage; electric circuits including circuit controlling means controlled by said carriage for energizing said electro-magnets; and a switchboard for varying the connections of said circuits with said electro-magnets.

48. In a typewriting and computing machine, the combination of a plurality of registers; operating means therefor; means including electro-magnets for controlling selectively the engagement of said registers with said operating means; typewriting mechanism including printing instrumentalities and a traveling carriage; electric circuits; means controlled by said carriage for automatically controlling said circuits, said means being adapted to close said circuits either singly or more than one at a time as desired, and said circuits being adapted to energize said electro-magnets; and a switchboard for varying the connections of said circuits with said electro-magnets.

49. In a typewriting and computing machine, the combination of a plurality of non-traveling registers; operating means therefor; means including electro-magnets for controlling selectively the engagement of said registers with said operating means; typewriting mechanism including printing instrumentalities and a traveling carriage; a series of electrical contacts; means controlled by said carriage for coöperating with said contacts to close electrical circuits through said electro-magnets; and a switchboard for varying the connections of said contacts with said electro-magnets.

50. In a typewriting and computing machine, the combination of a plurality of non-traveling registers; operating means therefor; typewriting mechanism including printing instrumentalities and a traveling carriage; selective devices controlled by said traveling carriage; means whereby said selective devices control the engagement of said registers with said operating means; and means for varying the connections between said selective devices and said registers to change the register or registers controlled by the several ones of said devices.

51. In a typewriting and computing machine, the combination of a plurality of non-traveling registers; means for operating said registers; typewriting mechanism including printing instrumentalities, a traveling carriage, and tabulator mechanism having column stops and coöperating stops; register selecting devices engaged selectively by said column stops; and changeable means between said selecting devices and said registers for bringing a predetermined one or more of said registers into operation at positions of said carriage determined by said column stops, and for changing the connections at will to cause a different register to be selected as required by the character of the work.

52. In a typewriting and computing machine, the combination of a plurality of non-traveling registers; means for operating said registers; typewriting mechanism including printing instrumentalities and a traveling carriage; a series of register selecting devices; means controlled by the carriage for coöperation with said devices selectively; and changeable connections between said registers and said register selecting devices whereby the register or registers selected by the said devices for operation can be varied.

53. In a typewriting and computing machine, the combination of a plurality of non-traveling registers; means for operating said registers; typewriting mechanism including printing instrumentalities and a traveling carriage; register selecting devices; means controlled by said typewriter carriage to coöperate with said devices selectively, said means being changeable to vary the device or devices selected at a predetermined position of said carriage; and changeable connections between said devices and said registers, the whole construction being such that the register or registers to be operated can be changed by changing the carriage controlled means, and also by changing the connections between the registers and the devices selected by said carriage controlled means.

54. In a typewriting and computing machine, the combination of a plurality of non-traveling registers; means for operating said registers; typewriting mechanism including printing instrumentalities and a traveling carriage; a plurality of register selecting bars parallel with the travel of said carriage; means whereby said carriage in its travel coöperates with said bars selectively; and changeable connections to said registers whereby the selected bar or bars determines the register or registers to be operated, and whereby the register corresponding to a given bar can be changed.

55. In a typewriting and computing machine, the combination of a plurality of registers; means for operating said registers; typewriting mechanism including printing instrumentalities, a traveling carriage and tabulator mechanism having column stops and coöperating stops; lugs of different characters on said column stops, one character of lug for each register and each column stop having one lug or a plurality of lugs of different characters according as that particular column stop is designed to select one or another of said registers or a plurality of said registers; and means controlled by said lugs for selecting the register or registers to be operated; so that a suitable column stop can be made to select any one or more registers as required by the nature of the work.

56. In a typewriting and computing machine, the combination of a plurality of registers; means for operating said registers; typewriting mechanism including printing instrumentalities, a traveling carriage and tabulator mechanism having column stops and coöperating stops; lugs on said column stops differently disposed; a plurality of devices to be selected by said lugs, the device or devices to be selected depending upon the disposition of said lugs; and changeable connections from said devices to said registers to bring predetermined ones of said registers into operation.

57. In a typewriting and computing machine, the combination of a plurality of registers; typewriting mechanism including printing instrumentalities and a traveling carriage; means controlled by said typewriting mechanism for causing said registers to be operated selectively, said means including a plurality of electric circuits controlled by said typewriter carriage; and means for varying the connections of said circuits with the several said registers.

58. In a typewriting and computing machine, the combination of a computing machine having therein a plurality of registers and means for operating said registers; a typewriting machine having printing instrumentalities and a traveling carriage; electric circuits connecting said machines, certain of said circuits controlled by said typewriter carriage controlling the selection of the register or registers to be operated in predetermined positions of said carriage; means whereby the typewriting machine selects said circuits, said means being changeable to vary the selection of the circuits; and means between said selecting means and said registers for changing the connections of said circuits with said registers.

59. In a typewriting and computing machine, the combination of a computing machine having a plurality of registers and means for operating said registers; a typewriting machine having printing instrumentalities and a traveling carriage; and electric circuits connecting said machines; means controlled by certain of said circuits for selecting the register or registers to be operated; and means between the typewriting mechanism and the registering mechanism for varying the connections of said register selecting circuits with said registers.

60. In a typewriting and computing machine, the combination of a computing machine having a plurality of registers and means for operating said registers; a typewriting machine having printing instrumentalities and a traveling carriage; electric circuits connecting said machines, certain of said electric circuits being controlled automatically by said typewriter carriage and having means controlled thereby for selecting the register or registers to be operated at predetermined positions of said carriage; and means in the typewriting machine variable to change the control of said circuits by said carriage.

61. In a typewriting and computing machine, the combination of a plurality of registers; operating means common to said registers; typewriting mechanism including printing instrumentalities and a traveling carriage; and means whereby said typewriting mechanism controls said registers and their operating means, said controlling means including electric circuits for automatically controlling selectively the engagement of said registers with said operating means.

62. In a typewriting and computing machine, the combination of a plurality of registers; operating means for said registers; typewriting mechanism including printing keys, types and a traveling carriage; electrical devices controlled by said keys for controlling the numbers to be registered; and electrical devices for selecting the register or registers to be operated, said selecting devices including elongated contacts and coöperating contacts, said elongated and coöperating contacts arranged to hold a register in engagement with said operating means during a predetermined part of the travel of said carriage.

63. In a computing machine, the combination of a series of segmental racks, a series of registers disposed about said racks, a series of links pivoted co-axially with said racks, connections from said links to said registers, and means for operating said links, as desired, to draw said registers into engagement with said racks.

64. In a computing machine, the combination of a series of segmental racks, a series of registers disposed about said racks, a series of yoke-frames pivoted co-axially with said racks and each having an arm at each end thereof, and connections from said arms to said registers to move said registers into and out of engagement with said racks.

65. In a computing machine, the combination of a series of register wheels each having a gear wheel fixed thereto, and each of said wheels above that of lowest order having a loose gear wheel associated therewith but not permanently fixed thereto, racks for engagement with said loose gear wheels, means ordinarily connecting said loose gear wheels with said fixed wheel, and transfer mechanism including means controlled by a wheel of lower order for turning a wheel of higher order and for disconnecting said wheel of higher order from said loose wheel.

66. In a computing machine, the combination of a series of register wheels, a loose gear wheel between each two adjacent register wheels, racks for engagement with said loose wheels, disconnectible means for connecting each of said loose wheels with the register wheel at the left thereof when said loose wheel is turned by said rack, and transfer mechanism including means for turning the wheel of higher order from the wheel of lower order while said loose wheels are geared to said racks.

67. In a computing machine, the combination of a series of register wheels, a series of loose wheels, one between each pair of adjacent register wheels, operating means for said loose wheels, means whereby a wheel of lower order moves a wheel of higher order to transfer, and means for connecting each of said loose wheels with the register wheel at the left thereof when said loose wheel is operated and for disconnecting said loose wheel from said register wheel when said register wheel is receiving an increment of motion by transfer.

68. In a computing machine, the combination of a series of register wheels, loose wheels, one interposed between each two adjacent register wheels, means for operating said loose wheels, means for connecting each of said loose wheels with the register wheel at the left thereof when said loose wheel is operated, a coupling device for connecting two consecutive register wheels together temporarily to transfer, and means for disconnecting the loose wheel from the register wheel that is to receive motion by transfer.

69. In a computing machine, the combination of a series of register wheels, loose wheels, one interposed between each two adjacent register wheels, means for operating said loose wheels, a shiftable frame, means controlled by said frame for connecting a loose wheel with the register wheel at the left thereof, means controlled by said shiftable frame for connecting two consecutive register wheels together whereby the register wheel of higher order receives an increment of motion from that of lower order, and means for shifting said frame to throw said connecting means into operation alternatively.

70. In a computing machine, the combination of a series of register wheels, loose wheels, one interposed between each two adjacent register wheels, a pinion for engagement with a loose wheel and the register wheel at the left thereof to connect the two wheels operatively together, means for operating said loose wheels, and transfer mechanism including means for throwing said pinion out of gear.

71. In a computing machine, the combination of a series of register wheels, loose wheels, one interposed between each two adjacent register wheels, a pinion for engagement with a loose wheel and the register wheel at the left thereof to connect the two wheels operatively together, means for operating said loose wheels, and transfer mechanism for throwing said pinion out of gear, imparting an increment of motion to said register wheel independently of said loose wheel and moving said pinion back into gear.

72. In a computing machine, the combination of a series of register wheels, loose wheels, one interposed between each two adjacent register wheels, a pinion for engagement with a loose wheel and the register wheel at the left thereof to connect the two wheels operatively together, means for operating said loose wheels, and transfer mechanism including means for throwing said pinion out of gear, and means for positioning said pinion when out of gear to bring a tooth thereof accurately into position to reënter said loose gear and said register wheel.

73. In a computing machine, the combination of a series of register wheels and transfer mechanism including a toothed coupling device arranged for radial motion into and out of position to couple two of said wheels together and for motion with said wheels to cause one of them to be turned by the other, a pivoted arm for guiding said coupling device, and means on the wheel of lower order for swinging said arm about its pivot to move said coupling device radially.

74. In a computing machine, the combination of a series of register wheels, loose wheels, one between each two adjacent register wheels, means for operating said loose wheels, means connecting a loose wheel with the register wheel at the left thereof when said loose wheel is being operated, and transfer mechanism including a coupling device for coupling the wheel at the left of said toothed wheel with the wheel at the right thereof, said coupling device being formed to straddle said loose wheel.

75. In a computing machine, the combination of a series of register wheels, loose wheels, one interposed between each two adjacent register wheels, means for operating said loose wheels, means connecting a loose wheel with the register wheel at the left thereof when said loose wheel is operated, transfer mechanism including a shiftable part, a disk on the wheel of lower order for normally holding said shiftable part in one position, said disk having a notch to permit of said part shifting to another position, a lug on said wheel of lower order for shifting said part to said other position, and means controlled by said shiftable part for coupling the two register wheels together and uncoupling the loose wheel from its register wheel.

76. In a computing machine, the combination of a register comprising a series of register wheels, a series of operating racks one for each wheel, means for operating said racks, and transfer mechanism comprising means controlled by a wheel of lower order for turning a wheel of higher order, and means for momentarily disconnecting said wheel of higher order from its rack to permit of such motion.

77. In a computing machine, the combination of a register comprising a series of register wheels, a series of racks for operating said register wheels, means for bringing all of said register wheels and said racks into and out of engagement, and transfer devices including means for momentarily disconnecting from its rack independently of other register wheels that register wheel which is to receive an increment of motion by transfer.

78. In a computing machine, the combination of a series of register wheels, a series of operating devices one for each of said wheels, a transfer mechanism including means for momentarily disconnecting from its operating means that register wheel only which is to receive an increment of motion by transfer.

79. In a computing machine, the combination of a series of register wheels, a series of operating devices, one for each wheel, a group of keys common to all of said wheels, means whereby said keys cause said operating devices to operate one at a time and transfer mechanism including means for momentarily disconnecting from its operating devices independently of other register wheels that register wheel which is to receive an increment of motion by transfer.

80. In a computing machine, the combination of a plurality of registers each including a series of register wheels, a series of operating devices common to said registers, one operating device for each denomination, means for engaging said registers selectively with said operating devices one register at a time or more than one register at a time as desired, a group of keys common to all of said operating devices, means whereby said keys cause said devices to be operated one at a time, and transfer mechanism for the several registers including means for momentarily independently disconnecting from its operating device that register wheel which is to receive an increment of motion by transfer.

81. In a computing machine, the combination of a series of register wheels, means for operating said wheels, and transfer mechanism including a coupling device mounted for radial and turning motion, a slotted arm for engaging said coupling device, said coupling device being adapted to move in the slot in said arm, means controlled by a wheel of lower order for moving said arm inward to engage said coupling device with two consecutive register wheels, means for restoring said arm to normal position at the end of a transfer operation, and means for restoring said coupling device to normal position in said slot.

82. In a computing machine, the combination of registering devices, keys, electrical contacts controlled by said keys for sending a rapid succession of electrical impulses through two electro-magnets alternately, a reciprocatory device moved in one direction by one of said magnets and in the other direction by the other of said magnets, and means whereby said reciprocatory device causes the number corresponding to the operated key to be registered on said registering devices.

83. In a computing machine, the combination of a series of keys, a continuously rotating shaft, a series of contact rings controlled by said shaft and adapted to be moved into engagement therewith when a key is operated, and connections between said shaft and each said ring such that said ring can become coupled to said shaft only at predetermined intervals.

84. In a computing machine, the combination of a series of keys, a continuously rotating shaft, a series of contact rings adapted for engagement with said shaft and their engagement with said shaft controlled by said keys, means for automatically disengaging the rings from said shaft, and registering mechanism controlled by said rings, the construction and arrangement being such that a ring can come into engagement with the shaft only at a certain period or point in the rotation of said shaft, and that a ring becomes disconnected from the shaft at about the same point or period, whereby two rings cannot be connected with the shaft at the same time except by two keys being struck very nearly together.

Signed at Syracuse, in the county of Onondaga, and State of New York, this 29th day of January A. D. 1913.

HERBERT H. STEELE.

Witnesses:
BESSIE G. KITTELL,
HARRY BARRY.